US006675173B1

(12) United States Patent
Shadmon

(10) Patent No.: US 6,675,173 B1
(45) Date of Patent: Jan. 6, 2004

(54) DATABASE APPARATUS

(75) Inventor: Moshe Shadmon, Tel-Aviv (IL)

(73) Assignee: Ori Software Development Ltd., Tel-Aviv (IL)

( * ) Notice: Subject to any disclaimer, the term of this patent is extended or adjusted under 35 U.S.C. 154(b) by 0 days.

(21) Appl. No.: 09/475,303

(22) Filed: Dec. 30, 1999

Related U.S. Application Data

(63) Continuation of application No. 09/010,844, filed on Jan. 22, 1998, now abandoned, which is a continuation-in-part of application No. 08/981,010, filed as application No. PCT/IL97/00248 on Jul. 22, 1997, now abandoned.

(51) Int. Cl.[7] .............................................. G06F 17/30
(52) U.S. Cl. ...................................................... 707/102
(58) Field of Search ......................................... 707/102

(56) References Cited

U.S. PATENT DOCUMENTS 4,606,002 A     8/1986   Waisman et al.
4,611,272 A  * 9/1986   Lomet ............................ 707/3

(List continued on next page.)

FOREIGN PATENT DOCUMENTS

WO    WO 98/04980     2/1998
WO    WO 99/38094     7/1999

OTHER PUBLICATIONS

Software–Practice and Experience, vol. 25, No. 2, Feb., 1995, "Efficient Implementation of Suffix Trees", Arne Andersson et al., pp. 129–141.
IEEE Transactions on Software Engineering, vol. 17, No. 7, Jul. 1991, "Trie Hashing With Controlled Load", Witold A. Litwin et al., pp. 678–691.
Addison–Wesley XP002135679 120440, "The Art of Computer Programming", vol. 3, 1988, pp. 471–479.
Horowitz and Sahni, Fundamentals of Data Structures, Computer Science Press, 1976.*
Peter Blumulis et al., "A compact B–tree", SIGMOND Conference, Jun. 3–6, 2002, 9 pages.
Rumbaugh J. et al., "Object Oriented Modeling and Design", 1987, Chap. 3, pp. 21–56.
H. F. Korth et al., "Database System Concepts" McGraw–Hill Int'l Editions, 1986, Chap. 3–5, 7–8, pp. 45–172 and 229–299.
G. Wiederhold, "File Organization for Database Design", McGraw Hill, 1987, pp. 272–273.
J. D. Ullman, "Physical Data Organization Principles of Database Systems", Jan. 1980, pp. 30–51.
Harden, Theo, "Implementing von Operationalen Schnittstellen" in Lockermann, P.C., Schmidt, J.W.: Daten bank – Hanbuch, Chapter 3, here: pp. 238–243, 1987, Sptinger, Berlin, Germany. (English–language translation attached).
P. Ferragina et al., "A fully–Dynamic Data Structure for External Substring Search" ACM Symposium on Theory of Computing (1995), pp. 693–702.

(List continued on next page.)

*Primary Examiner*—Wayne Amsbury
(74) *Attorney, Agent, or Firm*—Oliff & Berridge, PLC

(57) ABSTRACT

A method for obtaining a balanced digital tree structure. The digital tree structure including a first vertical oriented digital tree structure that is susceptible to unbalanced structure of blocks due to modify transactions. The first digital tree including blocks, each, accommodating a plurality of nodes and links originating from the nodes. The method includes the step of constructing few vertical oriented digital tree structure levels. The tress are arranged such that from blocks of a tree in a given level, it is possible to access horizontally all the blocks of the next level, according to a common key value of the accessed block, whereby a balanced horizontal oriented digital tree structure is obtained.

44 Claims, 14 Drawing Sheets

U.S. PATENT DOCUMENTS

| | | | |
|---|---|---|---|
| 4,945,475 A | | 7/1990 | Bruffey et al. |
| 5,058,144 A | * | 10/1991 | Fiala et al. .................... 341/79 |
| 5,202,986 A | * | 4/1993 | Nickel .......................... 707/3 |
| 5,230,047 A | * | 7/1993 | Frey, Jr. ........................ 714/4 |
| 5,257,365 A | | 10/1993 | Powers et al. |
| 5,293,616 A | | 3/1994 | Flint |
| 5,295,261 A | | 3/1994 | Simonetti |
| 5,333,317 A | | 7/1994 | Dann |
| 5,377,281 A | * | 12/1994 | Ballard et al. .............. 382/229 |
| 5,392,363 A | * | 2/1995 | Fujisaki et al. ............. 382/187 |
| 5,404,510 A | | 4/1995 | Smith et al. |
| 5,418,947 A | | 5/1995 | Hsu et al. |
| 5,487,166 A | | 1/1996 | Cossock |
| 5,488,717 A | | 1/1996 | Gibson et al. |
| 5,495,609 A | | 2/1996 | Scott |
| 5,497,485 A | | 3/1996 | Ferguson et al. |
| 5,528,701 A | * | 6/1996 | Aref ........................... 382/178 |
| 5,530,957 A | | 6/1996 | Koenig |
| 5,534,861 A | * | 7/1996 | Chang et al. ................. 341/51 |
| 5,551,027 A | | 8/1996 | Choy et al. |
| 5,557,786 A | | 9/1996 | Johnson, Jr. |
| 5,560,007 A | | 9/1996 | Thai |
| 5,644,763 A | | 7/1997 | Roy |
| 5,649,023 A | * | 7/1997 | Barbara et al. ............. 382/159 |
| 5,651,099 A | | 7/1997 | Konsella |
| 5,664,172 A | | 9/1997 | Antoshenkov |
| 5,694,591 A | | 12/1997 | Du et al. |
| 5,701,467 A | | 12/1997 | Freeston |
| 5,717,921 A | | 2/1998 | Lomet et al. |
| 5,737,732 A | | 4/1998 | Gibson et al. |
| 5,752,243 A | | 5/1998 | Reiter et al. |
| 5,761,652 A | | 6/1998 | Wu et al. |
| 5,765,168 A | | 6/1998 | Burrows |
| 5,768,423 A | * | 6/1998 | Aref et al. .................. 382/187 |
| 5,781,772 A | | 7/1998 | Wilkinson, III et al. |
| 5,787,430 A | * | 7/1998 | Doeringer et al. .......... 707/100 |
| 5,799,184 A | | 8/1998 | Fulton et al. |
| 5,799,299 A | | 8/1998 | Fujiwara |
| 5,809,296 A | | 9/1998 | Yong et al. |
| 5,832,182 A | * | 11/1998 | Zhang et al. ................. 706/50 |
| 5,842,196 A | | 11/1998 | Agarwal et al. |
| 5,848,416 A | | 12/1998 | Tikkanen |
| 5,873,087 A | | 2/1999 | Brosda et al. |
| 5,884,297 A | | 3/1999 | Noven |
| 5,963,956 A | | 10/1999 | Smartt |
| 5,970,170 A | * | 10/1999 | Kadashevich et al. ...... 382/179 |
| 6,014,659 A | | 1/2000 | Wilkinson, III et al. |
| 6,041,053 A | * | 3/2000 | Douceur et al. ............ 370/389 |
| 6,153,591 A | * | 11/2000 | Cai et al. ..................... 435/1.1 |
| 6,175,835 B1 | * | 1/2001 | Shadmon .................... 707/102 |
| 6,208,993 B1 | * | 3/2001 | Shadmon .................... 707/102 |
| 6,240,418 B1 | * | 5/2001 | Shadmon .................... 707/100 |

OTHER PUBLICATIONS

P. Ferragina et al., "The String B–Tree: A new Data Structure for String Search in External Memory and its Applications", Journal of the ACM 46 (2), Mar. 1999, pp. 236–280.

P. Ferragina et al., "An experimental study of SB–trees"; (Jun. 1996), NEC Research Index http://.citeseer.nj.nec.com/ferragina96experimental.html.

* cited by examiner

| ISBN | PUBLISHER | QUANTITY | | | | | |
|---|---|---|---|---|---|---|---|
| | AUTHOR | | | | | | |
| | SURNAME | FIRST NAME | SSNO | DATE LENT | DATE RETURNED | | |
| | TITLE | | | | | | |
| | ABSTRACT | | | | | | |
| | REFERENCE ISBN | | | | | | |
| | | TITLE | MAIN AUTHOR | PUBLISHER | | | |
| | CATEGORY | | | | | | |

FIG.12

DATABASE APPARATUS

This is a continuation of application Ser. No. 09/010/844 filed Jan. 22, 1998, abandoned, which in turn is a Continuation-In-Part of application Ser. No. 08/981,010 abandoned, which in turn is the U.S. National Stage of International Application No. PCT/IL97/00248, filed Jul. 22, 1997. The entire disclosure of the prior 844 application is hereby incorporated by reference herein in its entirety.

FIELD OF THE INVENTION

The present invention is in the general field of databases and database management systems.

BACKGROUND OF THE INVENTION

Using trees as a database structure for accessing data records is very common, and indeed, tree schemes that serve to this end are known in literature. When considering a large amount of data, it is of particular importance to maintain a so-called balanced structure of the tree, in order to avoid long paths for accessing a given data record from the root node to the leaf node that is associated with the sought data record. In order to cope with these shortcomings, various tree structures, such as the known Btree of 2- 3-tree, confer in inherent balanced tree structure, even after the tree has undergone modification, such as the insertion of a new data record, the deletion of an existing data record and/or the updating of the value of a given data record in the tree. The inherent balance (or essentially balanced) structure is accomplished, however, at the penalty of inflating the contents of the nodes in the tree and, consequently, unduly increasing the file size that holds the tree, particularly insofar as large trees which hold multitude of data records are concerned. The large volume of the files adversely affects the performance of the data management system in terms of accessing time to a sought data record, which is obviously undesired.

There are trees available in the art which are more efficient in terms of the volume of data that is held in entry nodes, e.g. the tri-S tree and, consequently, the file size of tri-S-tree, which holds the same number of data records, is significantly smaller than the counterpart size of an inherently balanced tree, e.g.-2-3-tree or Btree. However, the tri-S-tree is inherently unbalanced which, as explained above, adversely the affects the performance in terms of access time to data records, and whilst there are proposed techniques which render this tree balanced, the application thereof in real life scenarios is practically infeasible.

There is a accordingly a need in the art to provide a generic technique which will enable to essentially balance trees which are inherently susceptible to an unbalanced structure, and which will not interfere with the intrinsic search scheme that is associated with the new balanced tree.

Realization of data dictionaries which provide information as to the type of stored data, definition of data fields etc. is well known in the literature, and there are multitute techniques that serve to this end. There is however a need in the art to provide a a data dictionary structure that is incorporated with the digital tree structure. Reflection of the data model (such as, Hierarchy, Relational, Object Oriented, Object Relational) and reflection of several data models simultaneously from within the data elements and the embodiment of the data relations would allow higher efficiency in DBMS mechanism.

Detailed information on Tri-S (tries) can be found at—Donald Knuth, The Art of Computer Programming, Vol. III, Sorting and Searching, Third Edition, pages 481–490, 493–494, 499–502, 505. A specific form of tries is a compressed form of tires called Patricia tries—Donald Knuth, The Art of Computer Programming, Vol. III, Sorting and Searching, Third Edition, pages 490–493, 497–499, 501–504. A Patricia trie is an example of a sparse trie that differs from a standard trie in that nodes with one child are compressed into their parent node, so that all nodes have at least two children. An example of a Patricia trie, is shown in FIG. 3A, where the nodes are labeled with their depth: the position in the key represented by the node (in the example of FIG. 3A, the node represent nibble position in the key). Because not every character of the key is examined during the search, the record that is ultimately found must be checked against the search key. For example, if we search for record g (A333444) in FIG. 3A, we will follow nodes with the values 3 and 7 in block 60 and the node with the value 9 in block 61 to reach the g record by the link labeled 4. We now need to compare the search key with the key of record g hence a search for (A333445) would lead to record g as well. The size of the Patricia trie does not depend on the length of inserted keys. Rather, each new key adds at most a single link and node to the index regardless of the actual key length. Furthermore, the unlike B-trees, Patricia tries grow slowly even as large numbers of strings are inserted because of the aggressive (lossy) compression inherent in the structure.

Although researchers have long known about Patricia tries, such structures have rarely been used to manage large amounts of data, especially disk-based data, because they are unbalanced and best suited for usage in main memory. There is a need in the art for a structure that has the graceful scaling properties of Patricia tries, but that is balanced and optimized for disk-based access like B-trees.

SUMMARY OF THE INVENTION

The technique of the invention allows for a structure of the kind specified (applied for tries and sparse tries, not only to Patricia tries). It adds extra index layers to allow an update or search to proceed directly to the needed portion of the index. Every update and query accesses about the same number of layers, providing balanced access to the index. The extra layers constitute a horizontal index (referred to as horizontal oriented digital tree structure) that includes the vertical structure of the original index (in the example of FIG. 3A—a Patricia trie), referred to as vertical oriented digital tree structure.

The present invention provides for A method for obtaining balanced digital tree structure; the digital tree structure including a first vertical oriented digital tree structure that is susceptible to unbalanced structure of blocks due to modify transactions; the first digital tree including blocks, each, accommodating a plurality of nodes and links originating from said nodes; the method including the steps of:

constructing i (i>=1) vertical oriented digital tree structure levels which, along with said first digital tree structure, constitute i+1 vertical oriented digital tree structure levels,; said first digital tree constituting the lower vertical oriented tree; the i trees are arranged such that from blocks of the $j^{th}$ tree from among said i trees, it is possible to access horizontally all the blocks of the $(j+1)^{th}$, lower level, digital tree structure, according to a common key value of the accessed block, whereby an essentially balanced horizontal oriented digital tree structure is obtained.

Still further the invention provides for a method for obtaining a balanced digital tree structure; the tree including blocks each accommodating a plurality of nodes and links originated from said nodes; leaf nodes from among said nodes are associated with data records; the method comprising executing the following steps as many times as required:

(I) replacing a block, constituting a replaced block, with at least two split blocks, constituted by a splitting block and at least one split block, such that few from among the nodes of said split block are accommodated within said splitting block and the remaining nodes from among the nodes of said split block are accommodated within the al least one split block; the said few nodes including a splitting node associated with at least one split link and the remaining nodes including at least one split node associated with said at least one split link;

(II) in the case that said splitting block is not a child block,
  (a) constructing a father block;
  (b) coping at least the splitting node to the father block, thereby constituting at least one duplicate splitting node;
  (c) linking at least one duplicate splitting node to the splitting block by means of a direct pointer);
  (d) linking, by far link, at least one duplicate splitting node to the at least one split block; the far link(s) having the value of said split link(s);
  (e)

(III) in the case that said splitting block is a child block of a father block,
  (a) coping at least the splitting node to the father block in the case that it is not accommodated within the father block, the splitting block in the father block constituting a duplicate splitting node(s);
  (b) linking the duplicate splitting node or children node thereof in the father block, to the splitting block by means of a direct link
  (c) linking, by far link, the duplicate splitting node or children node thereof in the father block to the split block; the far link(s) having the value of said split link(s).
  (d) establishing a intra-block connections between the nodes in the father block in such a way that all the blocks connected with far links from the said nodes in the father block can be accessed by their common key applying the search scheme that is relevant in the vertical tree of the father block.

The invention further provides for a method for obtaining a balanced digital tree structure; the tree including blocks each accommodating a plurality of nodes and links originated from said nodes; leaf nodes from among said nodes are associated with data records; the method comprising executing the following steps as many times as required:

(i) replacing a block, constituting a replaced block, with at least two split blocks such that few from among the nodes of said split block are accommodated within one of said split blocks and the remaining nodes from among the nodes of said split block are accommodated within other split blocks;

(ii) coping at least one node from among the nodes of said replaced block into a block such that said at least two split blocks being children blocks thereof.

Still further, the invention provides for A method for obtaining balanced digital tree structure; the digital tree structure including a first vertical oriented digital tree structure that is susceptible to unbalanced structure of blocks due to modify transactions; the first digital tree including blocks, each, accommodating a plurality of nodes and links originating from said nodes; the method including the step of:

constructing an essentially balanced horizontal tree structure having probabilistic search characteristics.

The present invention still further provides for, in a digital tree structure having a probabilistic access characteristics, a method for recovering faulty search or modify transaction that is associated with a search path, comprising:

(i) returning in the search path to a node or block from which another search path can be commenced;

(ii) repeating step (I) until a correct search or modify transaction is accomplished, or a failure criterion is met.

The invention further provides for a memory containing a digital tree structure that was generated by the specified methods.

The present invention further provide apparatus which operates mutatis mutandis similar to the specified method aspects of the invention.

As will be explained in greater detail below, the procedure of constructing i digital tree structures preferably, although not necessarily, terminates when the uppermost level is constituted by a single block tree. In accordance with the invention, the balancing technique may be accomplished, on the fly in order to maintain balanced tree of blocks, or alternatively post factum in order to render unbalanced structure to an essentially balanced In the context of the invention, the hereinbelow terms should be construed as follows:

Replacing—encompasses, preferably although not necessarily, using the replaced block as one of the splitting or split blocks.

Obtaining balanced tree structure—encompasses applying the techniques of the invention, post factum, on an unbalanced structure, bringing about a balanced or essentially balanced structure, or, if desire, applying the technique of the invention on the fly, so as to maintain thus, a balanced or an essentially balanced structure whenever there is a necessity to split block.

Digital tree structure—encompasses any known and new search tree. The search tree encompasses trees that are susceptible to unbalanced structure, including but not limited to triS (pronounces try-S), the one defined in U.S. patent U.S. Pat No. 5,495,609 and others. Digital tree structure also encompasses trees which maintain essentially balanced structure, including but not limited to 2–3 tree Btree etc. As is well known, search tree is a data structure arranged as a tree which enables to access a data record(s) according to key(s) of the data record(s). Blocks and/or nodes of digital tree structure may be associated with part or all of the key relating to a node or to a block. In a specific embodiment, each block being associated with the common key or portion thereof. Other information relating or not relating to the search scheme may also be included in the Digital tree structure.

Search scheme—meaning the search path characteristics (i.e. the algorithm) that is used for accessing a given data record; intra-block search scheme meaning the search path characteristics (i.e. the algorithm) that is used, inside the block, for accessing a given data record. The data record is not necessarily accommodated within said block.

Leaf nodes are associated with data records—the term associated with encompasses any realization which enables to access data records from leaf nodes. Thus, by way of example, a data record may be accessed directly (i.e. through pointer) from the leaf node. By another non-limiting example, the leaf node points to data structure, (e.g. a table) which, in turn, enables to access data records. Other variants are of course, also feasible.

Modify transactions—transaction applied to a digital tree structure consisting of insert new data record, delete existing data record or modifying the value of existing data record.

Vertical orientated digital tree structure—conventional orientation of digital tree structure from root to leaves. As will be exemplified below, it is not always obligatory to maintain all the links between nodes and/or blocks in the vertical tree, and this is due to the construction of the horizontal oriented digital tree structure of the invention. This definition encompasses also deviation from conventional definition of tree e.g. a level of the Btree digital tree structure referred to for example in FIG. 4 below.

Horizontal oriented digital tree structure—having n levels of vertical orientated digital tree structures with the first level standing for the uppermost level and the $n^{th}$ level standing for the lowermost level which is normally associated with data records, and allows to move from a block in the $i^{th}$ level to a block in the $i+1^{th}$ level according to a common key value of the block.

Common key value of a block—a key portion that is associated with all nodes in a block. The common key value of a block is the key portion, common to all the data records that can be accessed from the block by the relevent search scheme. The common key is therefore a characteristic of all the nodes in the block. If desired, part or all of the common key may be held explicitly in the block.

Direct link—a link between a duplicated splitting node within a block in i vertical oriented digital tree to a block in the i+1 vertical oriented digital tree that includes the splitting node.

Far link—a link from a node in a block in I vertical oriented digital tree to a split block in the I+1 vertical oriented digital tree or to data records.

By another aspect, the invention provides for a memory containing at least one computer file that includes data representing a digital tree structure incorporating a data dictionary; the data dictionary including a feature that data records are grouped in at least two sub-trees each being indicative of a distinct type of data, and wherein all data records belonging to a given sub-tree, from among said at least two sub trees, are associated with respective type.

Still in accordance with the other aspect of the invention there is provided a memory containing at least one computer file that includes data representing a digital tree structure incorporating a data dictionary; the data dictionary including a feature that data records are grouped in at least two sub-trees each being indicative of a distinct type of data, and wherein all data records belonging to a given sub-tree, from among said at least two sub trees, are associated with respective type; the data dictionary further represents an ordered structure.

Still further, the invention provides for a memory containing at least one computer file that includes data representing a digital tree structure incorporating a data dictionary; the data dictionary including a feature that data records are grouped in at least two sub-trees each being indicative of a distinct type of data, and wherein all data records belonging to a given sub-tree, from among said at least two sub trees, are associated with respective types; said data dictionary further include data relationship feature.

The invention further provides for a memory containing at least one computer file that includes data representing a digital tree structure incorporating a data dictionary; the data dictionary including a feature that data records are grouped in at least two sub-trees each being indicative of a distinct type of data, and wherein all the data records belonging to a given sub-tree, from among said at least two sub trees, are associated with respective type; said data dictionary further represent levels of data records.

BRIEF DESCRIPTION OF THE DRAWINGS

For a better understanding, the invention will now be described by way of example only, with reference to the accompanying drawings: in which.

FIG. 12 shows a schematic illustration for exemplifying yet another feature provided by the data dictionary of the invention.

DESCRIPTION OF SPECIFIC EMBODIMENTS

Figure 1:
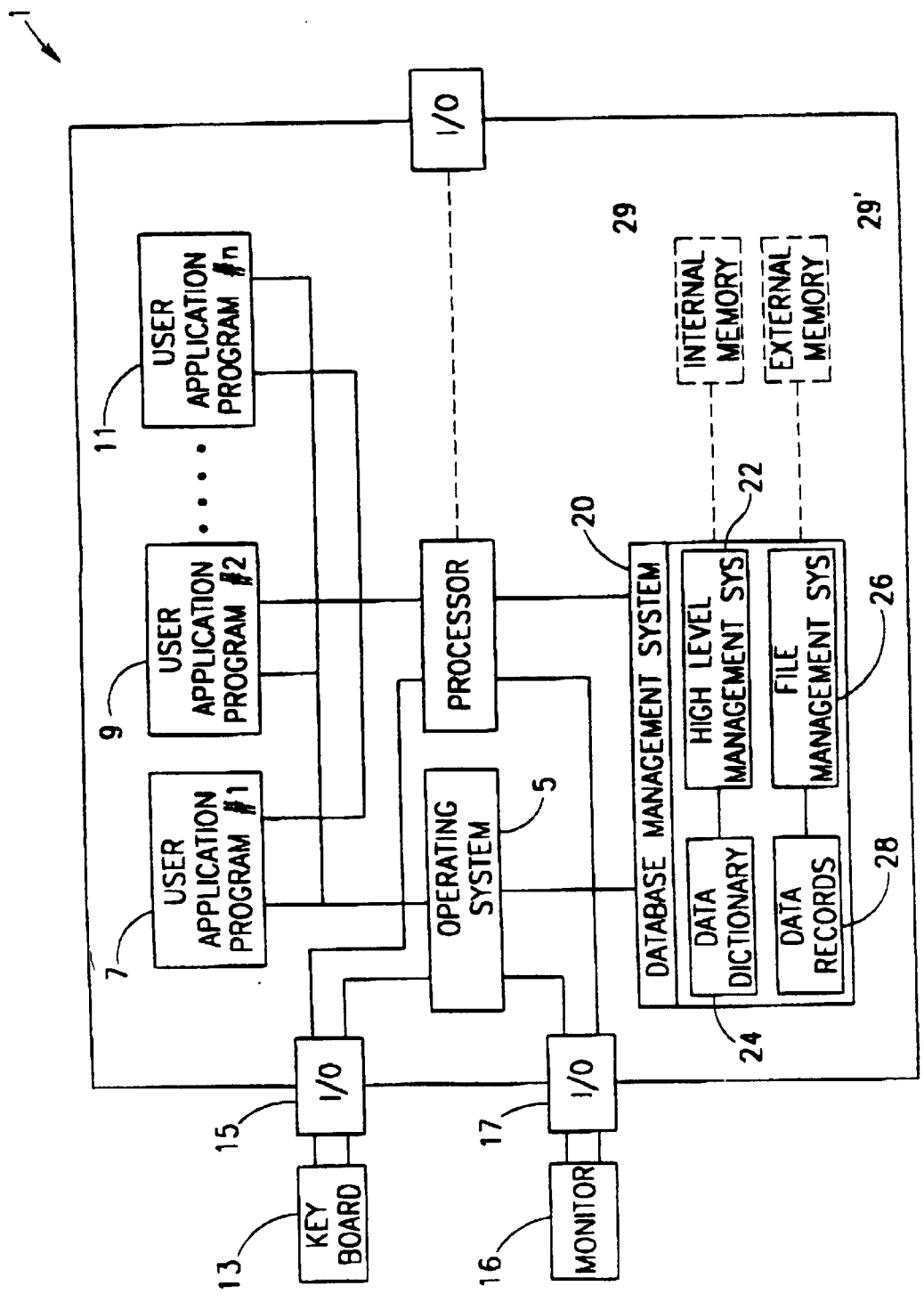
FIG. 1 shows a generalized block diagram of a system employing a database file management system that employs a digital tree structure of the invention.

Attention is first directed to FIG. 1 showing a generalized block diagram of a system employing a database file management system that employs a digital tree structure of the invention. Thus, a general purpose computer 1, e.g. a personal computer (P.C.) employing a Pentium® microprocessor 3 commercially available from Intel Corp. U.S.A, has an operating system module 5, e.g. Windows NT® commercially available from Microsoft Inc. U.S.A., which communicates with processor 3 and controls the overall operation of computer 1.

P.C. 1 further accommodates a plurality of user application programs of which only three 7, 9 and 11, respectively are shown. The user application programs are executed by processor 3 under the control of operating system 5, in a known per se manner, and are responsive to user input fed through keyboard 13 by the intermediary of I/O port 15 and the operating system 5. The user application programs further communicate with monitor 16 for displaying data, by the intermediary of I/O port 17 and operating system 5. The user application programs can access data stored in a database by means of database management system module 20. The generalized database management system, as depicted generally in FIG. 1, includes high level management system 22 which views, as a rule, the underlying data in a "logical" manner and is responsive, to the user application program by means known per se such as, e.g., SQL Data Definition and Data Manipulation language (DDL an DML). The database management system typically exploits, in a known per se manner, a data dictionary 24 which describes the logical structure of the underlying data.

The underlying structure of the data is governed by database file management system 26, which is associated with the actual data records 28. The "high-level" logical instructions (e.g. SQL commands) received and processed by the high-level management system 22 are converted into "lower level" commands that facilitate access paths to the data records that are stored in the database file(s) and to this end, the database file management system considers the actual structure and organization of the data records. The actual organization uses, of course, the digital tree structure of the invention. The "high level" and "low level" portions of the database file management system can communicate through a known per se Application Programmers Interface (API).

FIG. 1 further shows, schematically, an internal memory module 29 (e.g. 16 Mega byte and possibly employ a cache memory sub-module) and an external memory module 29' (e.g. 1 gigabyte). Typically, external memory 29 is accessed through an external, relatively slow, communication bus (not shown), whereas the internal memory is normally accessed by means of a faster internal bus (not shown). Normally, by virtue of the relatively small size of the internal memory, only those applications (or portions thereof) that are currently executed are loaded from the external memory into the internal memory. By the same token, for large databases that cannot be accommodated in their entirety in the internal memory, a major portion thereof is stored in the external memory. Thus, in response to an application generated query that seeks for one or more data records in the database, the database management system utilizes operating system services (i.e. an I/O operation) in order to load, through the external communication bus, one or more blocks of data from the external to the internal memory. If the sought data records are not found in the loaded blocks, successive I/O operations are required until the sought data records are targeted. It is accordingly highly desired to have an essentially balanced structure of the tree of blocks, in order to reduce the number of slow I/O operations (on the average) that are required in order to access a sought data item.

It should be noted that for simplicity of presentation, the internal and external memory modules 29, 29', are separated from the various modules 5, 7, 9, 11, 20. Clearly, albeit not shown, the various modules (operating system, DBMS, and user application programs) are normally stored in the external memory and their currently executed portions are loaded to the internal memory.

Computer 1 may serve as a workstation forming part of a LAN Local Area Network (LAN) (not shown) which employs a server having also essentially the same structure of FIG. 1. To the extent that the workstations and the server employ client-server based protocols a predominant portion of said modules (including the database file management system 26 and the database records themselves 28) reside in the server.

Those versed in the art will readily appreciate that the foregoing embodiments described with reference to of FIG. 1 are only two out of many possible variants. Thus, by way of non-limiting example, the database may be an on-line database residing in an Internet Web site. It should be further noted that for clarity of explanation system 1 is illustrated in a simplified and generalized manner. A more detailed discussion of database file management systems and in particular of the various components that are normally accommodated in database file management systems can be found, e.g. in Chapter 7 of "Database System Concepts" ibid.

Figure 2A:
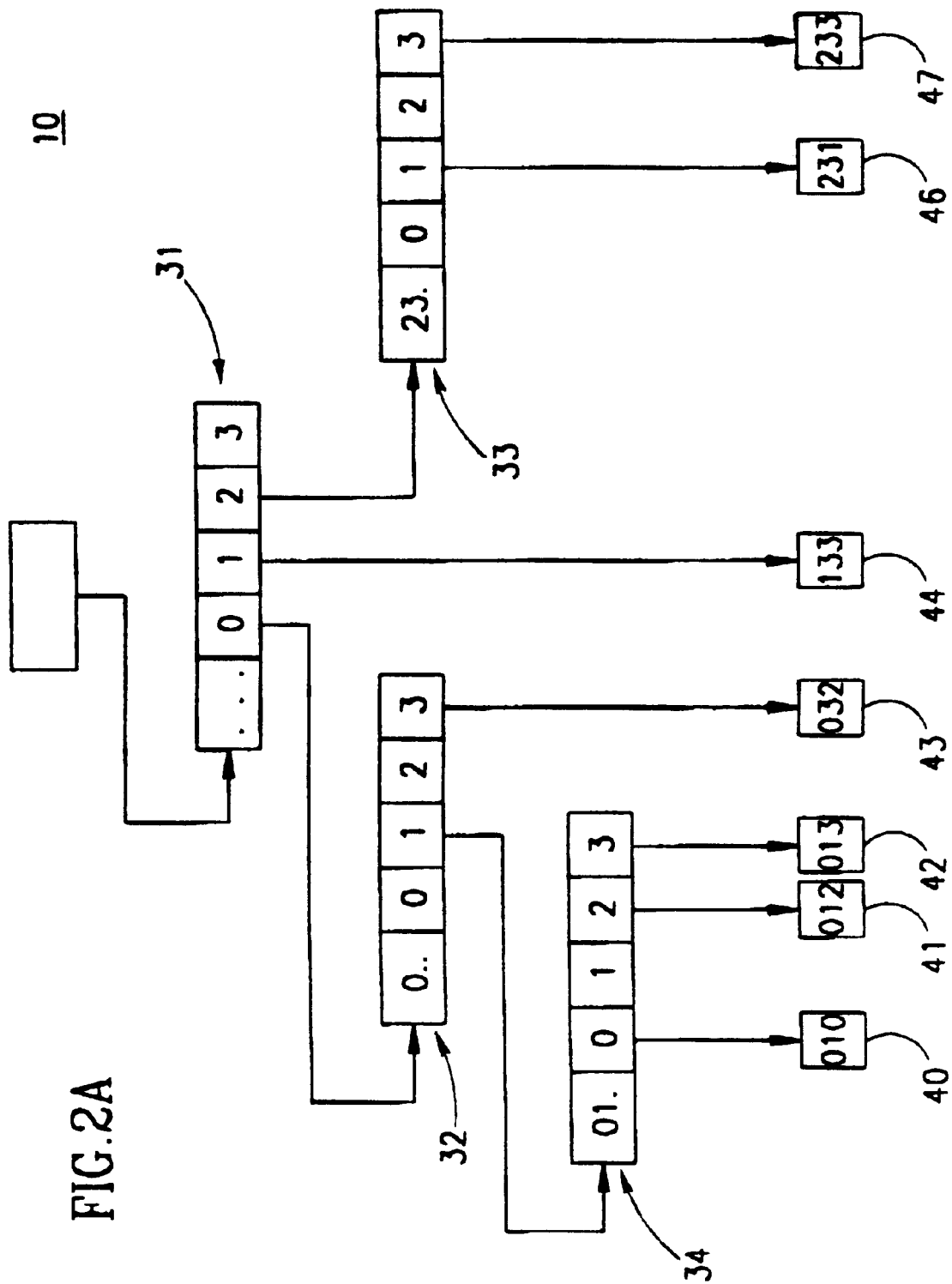
FIGS. 2A–2B show respectively, a digital tree structure according to the prior art before and after applying the technique of the invention.

The operation of the split block of the invention, in order to accomplish an essentially balanced digital tree structure will now be described with reference to a digital tree structure of the kind described for example in U.S. Pat. No. 5,495,609. In FIG. 1 of the '609 patent a digital tree structure of index nodes is shown. Assuming that the digital tree structure consists of a block that accommodates nodes (see FIG. 2A) 31, 32, 33 and 34. Should it now be required to split the block subsequent to the insertion of new nodes to the tree, a possible approach of splitting the block in accordance with prior art techniques, would be, for example, to break the link between node 32 and 34, to thereby obtain two blocks, one accommodating nodes 31,32 and 33, whereas the other accommodating node 34. If, for example, it is now required to reach record 46, only one I/O operation is required i.e. to fetch the block accommodating nodes 31, 32 and 33. If, on the other hand, record 40 is of interest, a first I/O operation is required, in order to access the specified block (i.e. the one accommodating nodes 31, 32 and 33), and therefrom another (i.e. second( I/O operation is required, in order to access the block accommodating node 34 and therefrom data record 40. It is accordingly, appreciated that the split operation gave rise to an unbalanced structure. Subsequent insert transactions may adversely affect the unbalanced structure of the tree, which is obviously undesired.

Figure 2B:
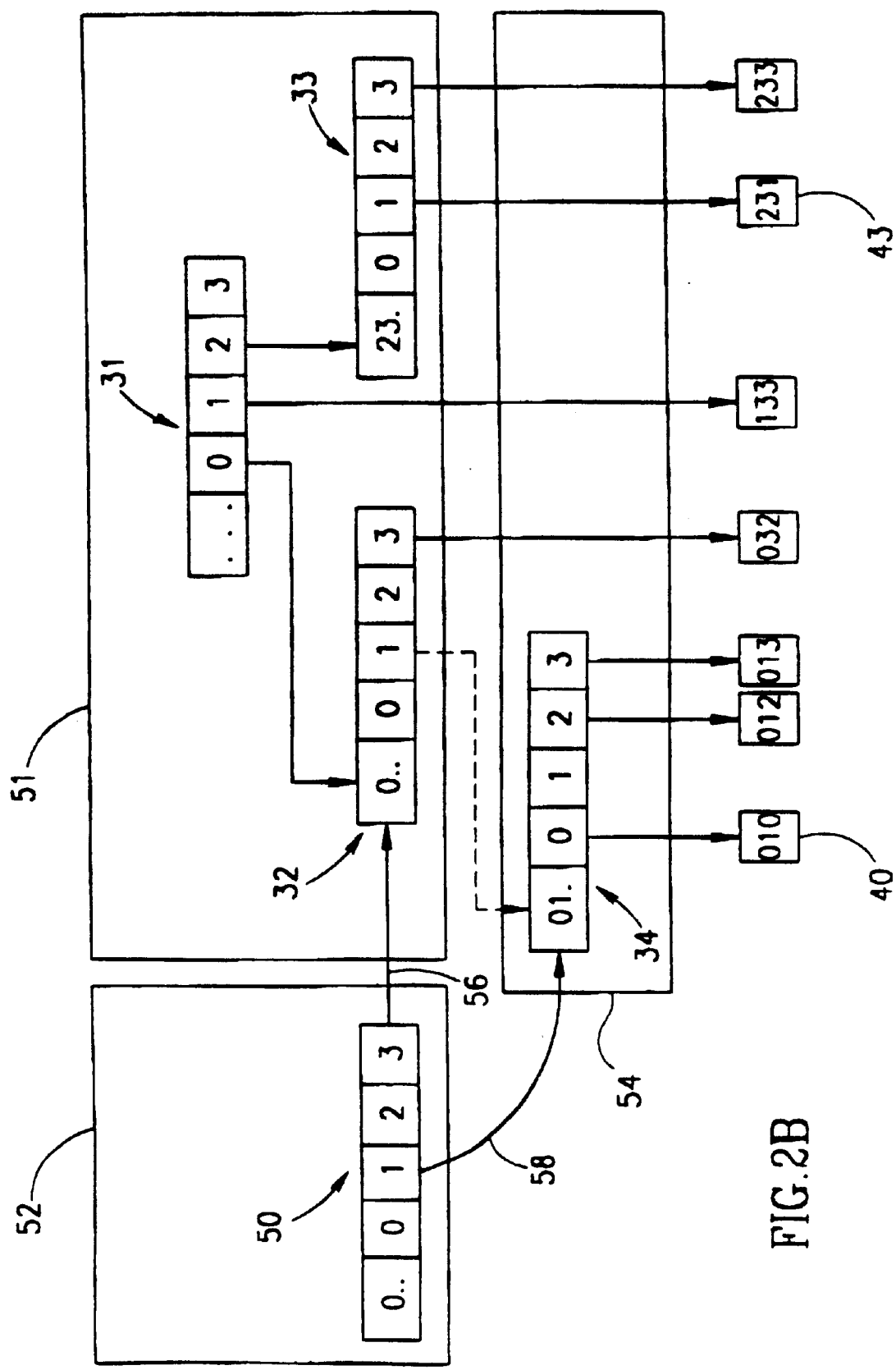

Applying the technique of the invention will cope with the shortcomings of an unbalanced structure, and the resulting tree is illustrated in FIG. 2B. Here also, the link between node 32 and 34 was broken for the purpose of splitting the blocks, and new node (constituting a duplicate splitting node), 50, is inserted into a new block (constituting a father block being an upper level vertical tree) designated as 52. Now, in order to access record 40 and record 46, the same number of I/O operations is required, and in this particular case, 2.

The split block technique of the invention brings about, thus, an essentially balanced structure tree of blocks, assuring that essentially the same number of I/O operations is required to reach each and every data record in the tree. Those versed in the art will readily appreciate that the number of I/O operations is a function of the block size and node size, and thus, for example, if 1000 far links originate from a block, a tree with 3 levels allows access to 1,000,000,000 data records.

As shown, the resulting digital tree structure of FIG. 2B includes two trees having vertical orientation i.e. the first tree structure consisting of blocks 51 and 54 and second tree having one block 52. As is clearly shown, from the blocks (in this particular case one block 52) of the upper level tree it is possible to access (by this particular embodiment through links 56 and 58) all the blocks 51 and 54 of the lower level tree. The so accomplished horizontal tree of blocks is balanced, i.e. root block 52 which, through access of one I/O enables to access all the data records. Further insertions of data records which will lead to additional splits in the blocks in the lower level, will require, of course, the copying of additional nodes to block 52. When the number of nodes in block 52 exceeds a given number, block 52 can be split according to the same mechanism.

The digital tree structure with which the split block technique of the invention is of concern, is not confined to the search tree disclosed in the '609 patent, and it may encompass other types of trees as explained above.

It should be noted that the intra-block structure is not necessarily balance, i.e. nodes inside block are not necessarily arranged in a balanced structure. Whilst this fact is seemingly a drawback, those versed in the art will readily appreciate that its implications on the overall database performance are virtually insignificant. This stems from the fact that intra-block search scheme is normally performed in the fast internal memory of the computer system. As opposed to the intra-block search scheme, the arrangement of a block within a tree is retained in essentially balanced structure (constituting an embodiment of the second digital tree structure) thereby minimizing, on the average, the number of I/O accesses to the external memory (an operation which is inherently slow) in order to load a desired block to the internal memory.

In this connection those versed in the art will readily appreciated that the present invention is by no means bound to a given physical realization. Thus, for example, insofar as search scheme is of concern whilst the intra-block retains the search scheme after applying the technique of the invention this applies to the logical concept of e.g. advancing in the tree according to offsets and values of offset. The latter general concept may be realized in many manners all of which are encompasses by the technique of the invention. Thus, for example, the offset size (in terms of numbers of bits) that is accommodated within each node may be altered, the manner of realizing empty pointers (i.e. pointers that point to null—having no children) and others. The latter physical realization flexibility applies also to the inter-block portion.

Figure 3A:
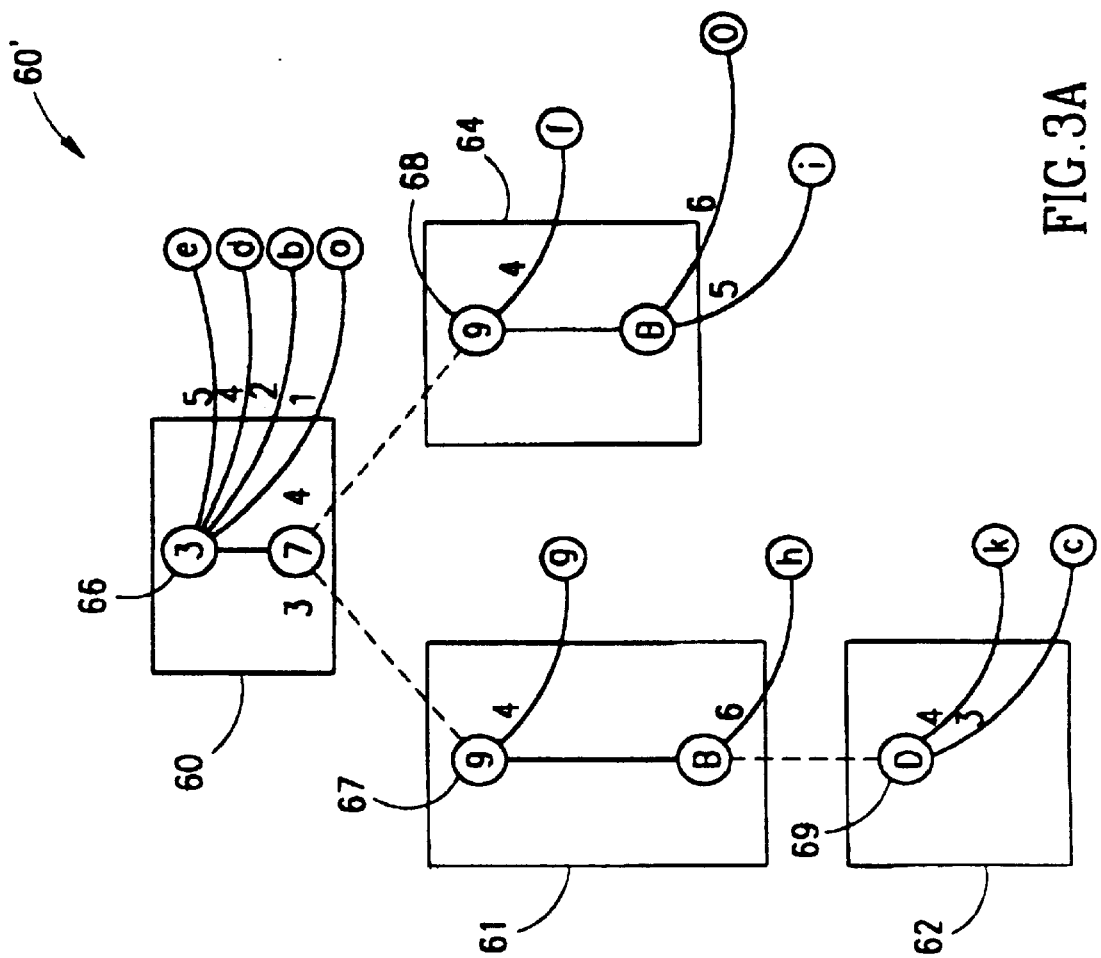
FIGS. 3A–3B show respective two illustrations exemplifying the application of the technique of the invention to a digital tree structure, according to another embodiment of the invention.
Figure 3B:
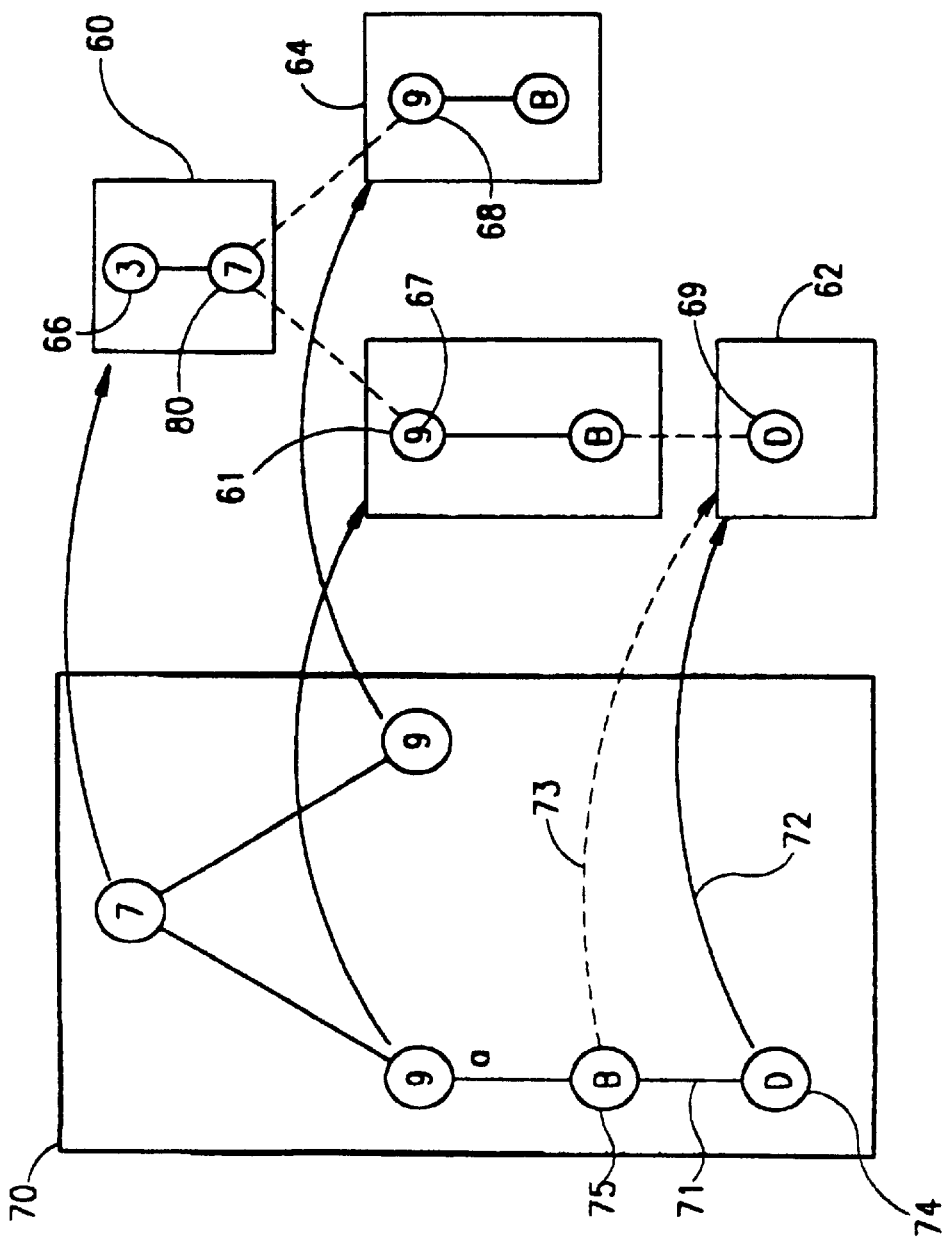

Attention is now directed to FIGS. 3A–3B showing respective two illustrations exemplifying the application of the technique of the invention to a digital tree structure, according to another embodiment of the invention.

Thus, FIG. 3A illustrates a given digital tree structure having vertical orientation which, as shown, is unbalanced i.e. three blocks depth (60, 61 and 62) vs. two blocks depth (60 and 64). The description below does not aim at explaining the search scheme of the specified vertical tree but emphasizes only those aspects which are required to obtain balanced tree. It should nevertheless noted that the nodes in digital tree structure 60' signify offsets in a half byte boundary (hexadecimal representation) of the data records (a–k) that are shown in FIG. 3A.

As extra I/O operation (i.e. reading three blocks—or three I/O operations in order to reach data record k vs. reading two blocks—or two I/O operations to reach data record o) as depicted in FIG. 3A may be regarded as an essentially balanced which does not call for applying the balancing technique of the invention. This notwithstanding, various applications may require to obtain an exact balanced tree, which, obviously necessitates to apply the technique of the invention.

The nodes at the top of each block for the common key, namely, node 66 (having value 3) in the block 60, node 67 (having value 9) in block 61, node 68 (having value 9) in the block 64 and node 69 (having value D) in block 62. FIG. 3B illustrates one possible embodiment of the invention. As shown, a second tree consisting of one block 70 is constructed with the result that horizontal balanced tree is obtained with root block 70 from which all the blocks of the lower level vertical tree are accessed through one I/O operation.

As shown, the actual access to the blocks in the first vertical tree are achieved by means of the common key value of each block. More specifically, each node that is pointing or pointed by a link that was split, (in this particular embodiments nodes 80,67,68, 69and 64), are copied to the higher level tree (to constitute duplicate nodes) and are all accommodated in one block. Now from the higher level (consisting here of single block 70), it is possible to access the blocks of the lower level according to common key criterion.

Figure 4:
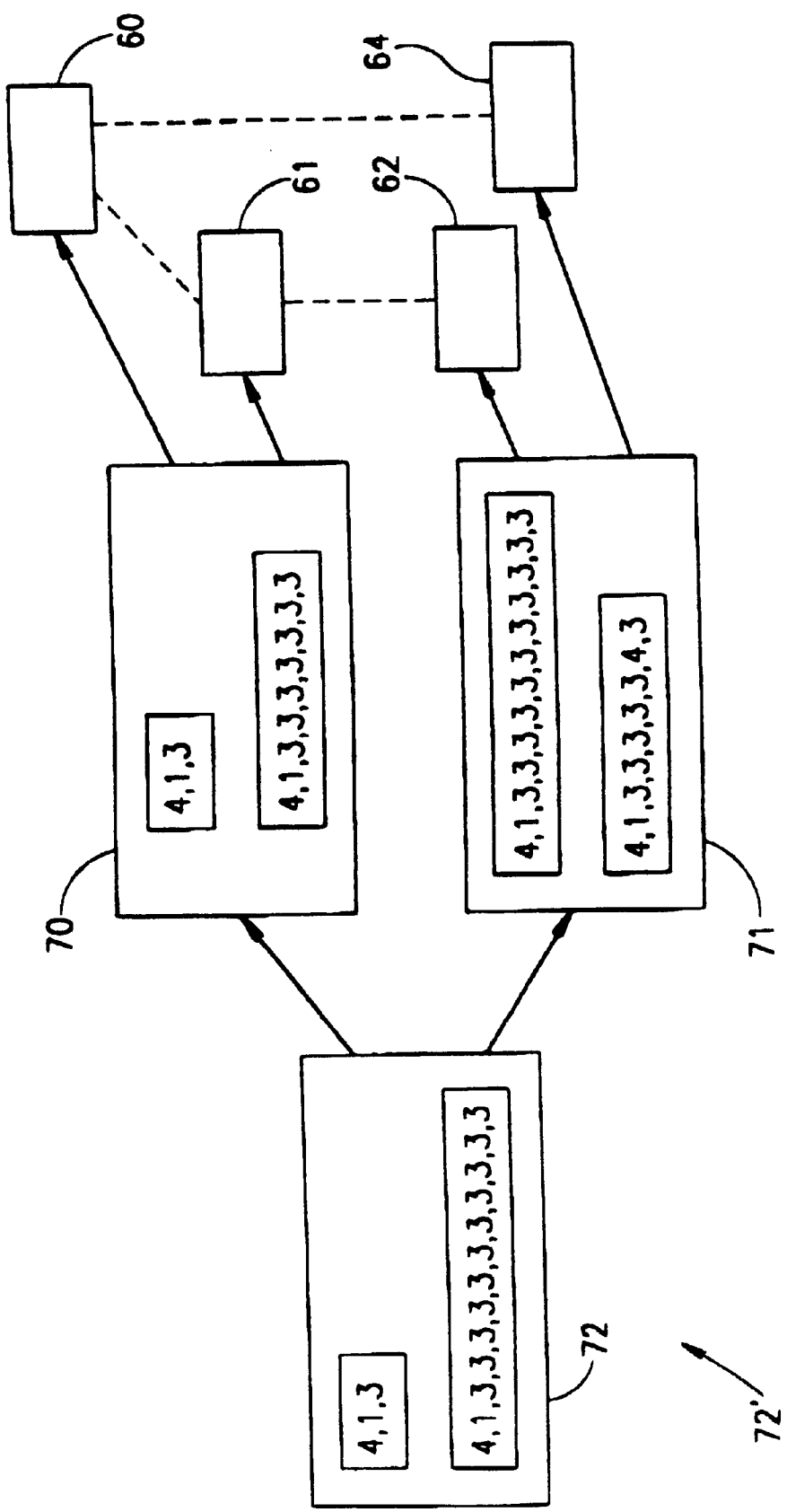
FIG. 4 shows a Btree structure that forms part of a horizontal oriented tree according to one embodiment of the invention.

FIG. 4 illustrates another approach of balancing an unbalanced tree of FIG. 3A using a conventional Btree which uses the common key values of blocks in the unbalanced digital tree as it's index elements. The so obtained horizontal oriented balanced tree includes blocks 72 at the upper level, 70 and 71 at a lower level and the original blocks of the unbalanced vertical oriented tree of FIG. 3A at the lowest (blocks 60,61,62,64). By this specific example, the level blocks 70 and 71 constitutes a vertical tree despite the fact that the blocks are not linked. FIG. 4 demonstrates thus that the search scheme of various vertical oriented trees is not necessarily the same as that of the original unbalanced digital tree structure.

The actual realization as depicted in FIG. 3B is only one possible variant. In FIGS. 5A–5G below, different realization will be presented.

Accordingly, attention is now directed to FIGS. 5A–5G showing a succession of modify (insert) operations on a binary tree and the so obtained balanced digital tree structure according to a specific embodiment of the invention.

In the following figures, digital tree structure will be constructed by inserting successively the following unsorted data records A–F:

A=001000011
B=110011100
C=011011111
D=011011011
E=101010101
F=111111111

An underlying assumption which serves for the explanation of the insert operations, is that three nodes or more in a given block of the tree, require a split operation.

In the first step (FIG 5A), record A is inserted to Block 100, with node 101 having offset 0, being associated to first record A through line 102, having the value 0. By this specific embodiment, the data records are associated with the leaf nodes through direct points. At this stage, the tree consists of Block 100 having only one node. The search scheme dictates that the search path to data record A is determined according to value '0' at offset '0 as depicted on link 102 and node 101, respectively.

Thereafter (FIG. 5B), data record B is inserted, in which, as can be clearly seen and distinguished from data record A, in offset zero, the data record value record is 1 and, accordingly, link 102 leads to data record B.

Thereafter (FIG. 5C), data record C is inserted, and the value thereof in offset 1, serves for distinguishing it from record A. Links 103 and 104 connect node 105 (standing for offset 1) to the specified data records C and A respectively. Since Block 100 accommodates nodes 101 and 105, it is not required, as yet, to split the block.

Figure 5A:
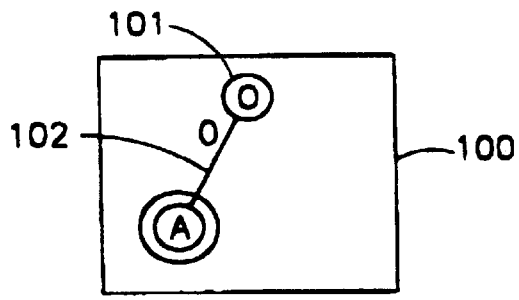
FIGS. 5A–5G show a succession of modify (insert) operations and the resulting digital tree structure according to a specific embodiment of the invention.
Figure 5B:
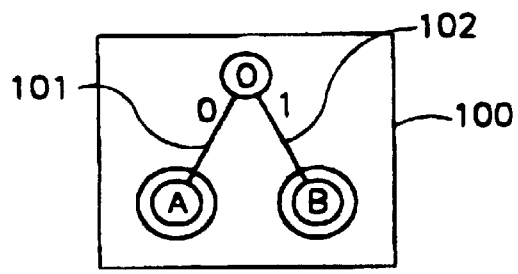
Figure 5C:
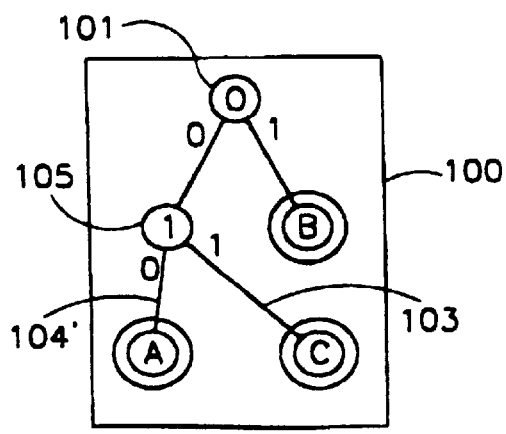
Figure 5D:
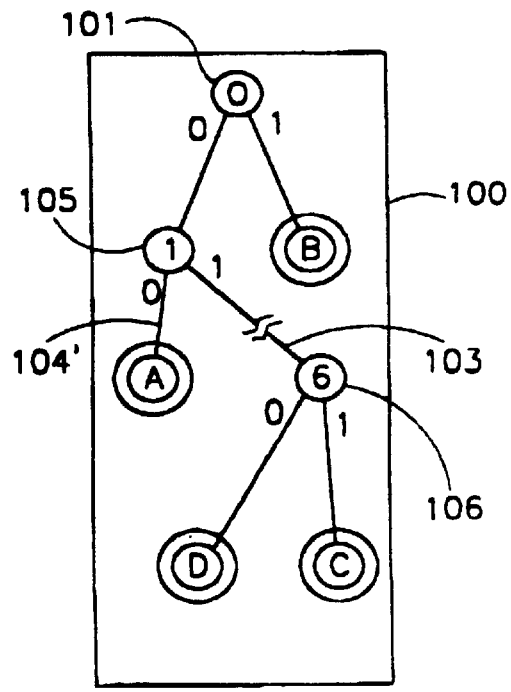
Figure 5E:
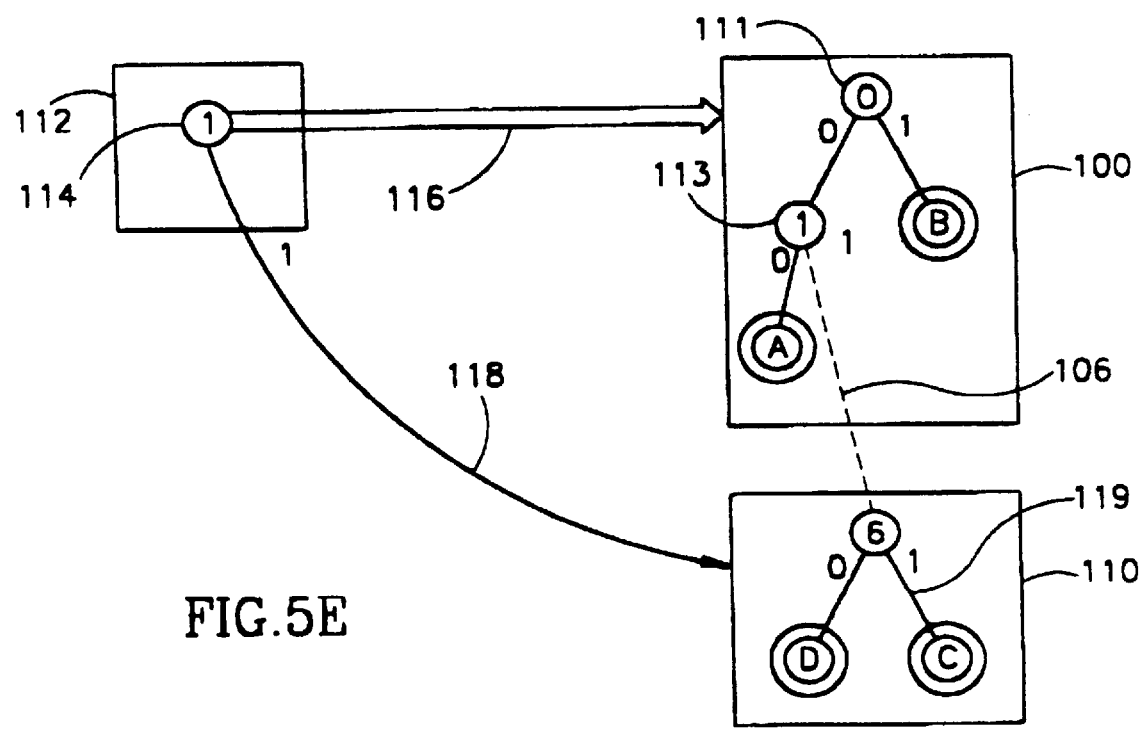
Figure 5F:
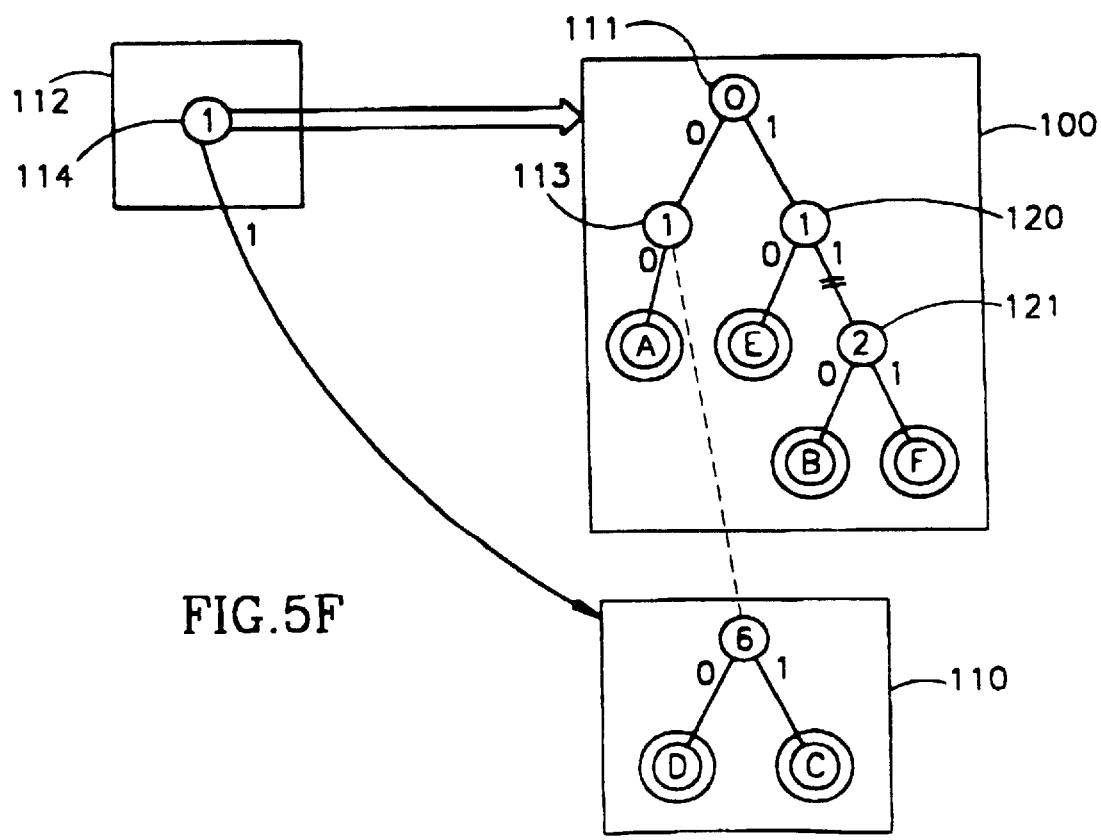

Next, data record D is inserted, and the structure of the block before split is shown in FIG. 5D. Since, however, the data block cannot accommodate more than two nodes, it is now required to split Block 100. FIG. 5E illustrates the tree structure after splitting. Thus, link 106 is selected to be the split link with the motivation that approximately the contents of a half block will be retained in Block 100, and the contents of the remaining half block, will be moved to another block. Of course, other links could be likewise selected to be the split link.

As a first stage, as stipulated in Step,I, block 100 is replaced with two split blocks 100 and 110, standing for splitting block (100) and split Block (110). The nodes 0,1 (designated as 111 and 113, respectively) and the data records A and B are retained in the splitting block 100, whereas node 6, data records D and C, (standing in this particular embodiment for the remaining nodes), are moved to block 110. Accordingly, the vertical data tree structure of the block 100 consists now of two blocks 100 and 110.

Thereafter, since the splitting block 100 is not a child block, it is required, according to <u>Step II (a)</u>, to construct a further block, and, accordingly, block 112 is provided. Splitting node (113) is copied to the father block (Step II (b), to thereby constitute a duplicate splitting node (114). According to Step II (c), the duplicate splitting node (114) is linked by means of direct link 116 to a splitting block 100, Next, the duplicate splitting node 114 is linked by means of a far link 118, to the split Block 110 (Step II (d). This far link replaces the original split link 106 that is marked in FIG. 5E in a dashed line. The direction from node 114 to block 110 is the same direction as that from node 105 to node 106 in FIG. 5D.

It should be noted that there are no constraints as to whether the split link should be deleted or retained. As shown, the so obtained horizontal tree (consisting here on blocks 112, 100 and 110) is balanced.

Next, data record E is inserted. In this case advancing in the horizontal tree from the first node 114 of block 112 (having a value 1) is not possible by means of the far link 118 since it represents direction 1 from node 114 having a 1 value, and a link in direction 0 is required. Therefore advancing by means of the direct link 116 to block 100 (the block where the insert operation should be done) is performed. In the same way data record F is inserted resulting in a tree structure shown in FIG. 5F.

Figure 5G:
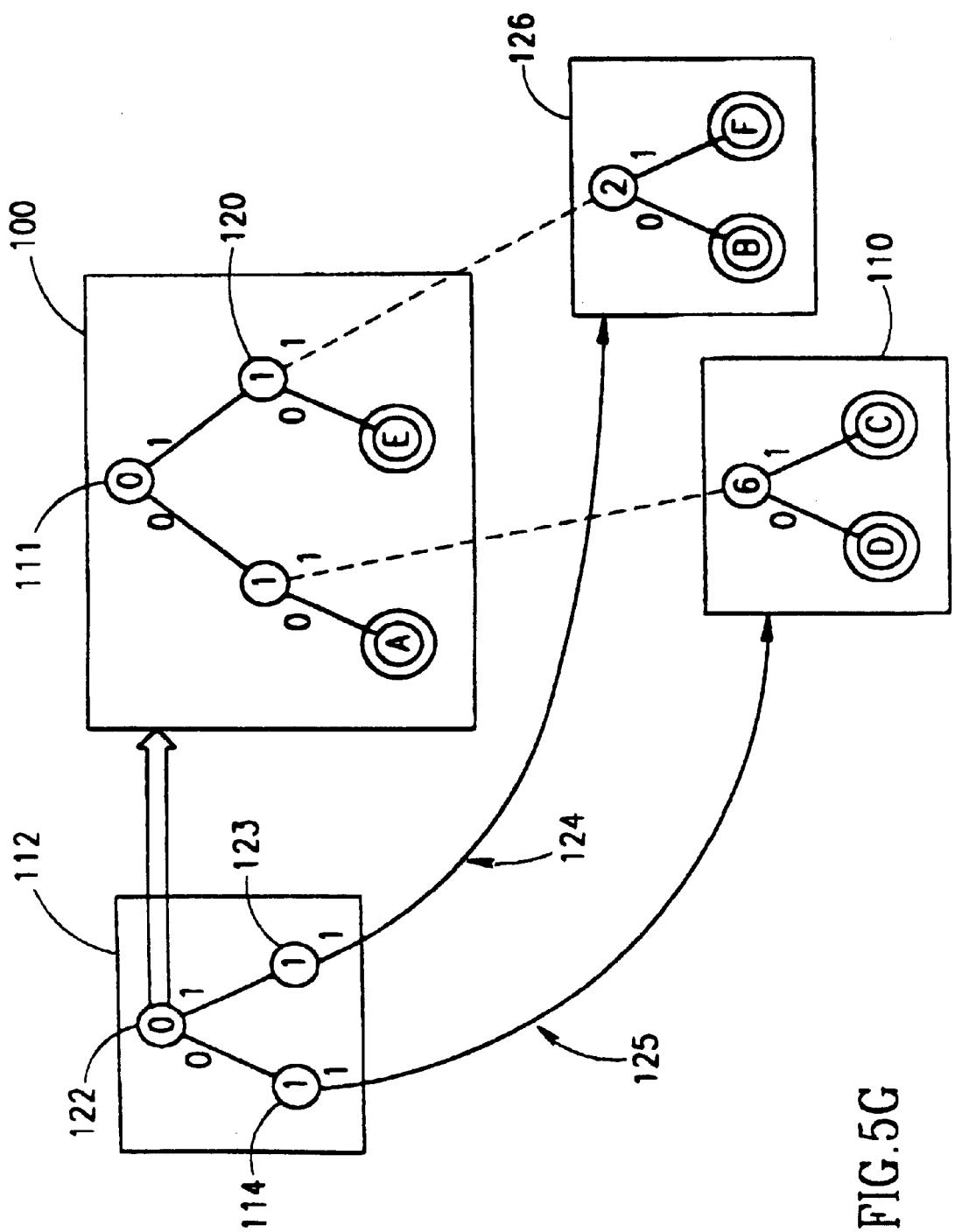

Next, if a split between node 120 and node 121 of block 100 is performed, node 120 is to be copied to block 112 (designated 123 in FIG. 5G)(Step IIIa) and since it can not be linked to node 114 of block 112 (since it will not retain the correct inta-block links of the nodes)—the first intersection node 111 of block 100 is also copied to block 112 (designated 122 in FIG. 5G) in order to reserve the links and directions between the original nodes of block 112 and the new copied nodes Step III(d). The result is shown in FIG. 5G. It should also be noted that instead of having direct links from all copied nodes 114,122,123 of block 112 in FIG. 5G, it would be sufficient to have one such direct link from the copied intersection node (122) to block 100 (Step III(b)). A far link 124 from node 123 is set to block 126 in the direction of the link before the tree underwent split (the direction between nodes 120 and 121 of FIG. 5F) (Step III(c)). Obviously, if another split is performed in block 126, it would be represented in block 112 by a node connected from node 123 in direction 1 heaving a direct link to the splitting block of 126 and a far link in the split direction to the split block of 126. The description in reference to FIGS. 1 5A–5G illustrates one of many possible embodiments for realizing steps I and III.

FIGS. 5A–G and 3A–B illustrate two of many possible manners of realizing the split block mechanism that maintains the balance structure of the invention. The flexibility in adopting another solution is shown e.g. in FIG. 3B where the link 71 and 72 are represented by far link 73 in the direction of link 71 (marked in dashed line), rendering thus node 74 redundant.

Insofar as many embodiments are concerned, the balance technique of the invention confers to the so obtained balanced horizontal oriented digital tree structure a so called "probabilistic access" characteristics. This means that a search path in connection with an input data record (e.g. search for a data record A), may lead to a different data record or to a node where there is no link to the direction prescribed by the search scheme.

For a better understanding of the foregoing consider, for example, FIG. 5E. Consider for example that a search transaction is applied to the digital tree structure of FIG. 5E with the data record L=111011110. The search path will follow node 114 and link 118 (offset l value 1, respectively) and then at offset '6' (root node of block 110) through link 119 (value '1') to what should be the correct place of data item L. The search procedure failed since, as shown, at the specified place data record C resides. The latter example exemplifies the probabilistic search characteristics of the so obtained horizontal digital tree structure.

In order to resolve the specified failure, the intersection between the sought data record and the actually associated data record is calculated. Thus, the value of the node (hereinafter calculated node) that would be created if only the sought data record and the associated data record were represented in the digital tree. Next, return to the first node having a value equal to or less than the calculated value which first node has a direct link. If the latter requirement is not met, i.e. all the nodes have a value greater than the calculated node, than from the root node. Now, from the first node (in the case it has equal or smaller value) or from the root (in the alternative case of larger value) move by means of direct link to a lower level vertical oriented tree and therefrom continue the search path as prescribed by the search scheme.

According to another scenario, should the search path prescribes to go in a given direction and there is no link in the desired direction, the return procedure as described above is applied until a first node with direct link is detected.

When advancing from block to block, a comparison to the common key (if available) or to data records associated with modes (if available), can lead to a faster decision as to whether or not to advance the search criteria or to return to a faster decision as to whether or not to advance the search criteria or to return to a mode with a direct link.

Reverting to the previous example (sought data record L) and associated data record C, the calculated node has the value 0 and thus the option of returning to the option of node having lower or equal value is not applicable. Accordingly the alternative of returning to the root node 114 having larger value ('1') applies. Therefrom through direct link 116 move to block 100 and start the search path as stipulated by the search scheme of the digital tree. Since data record L does not reside in the tree, obviously complying with the latter criterion does not lead to record L. The criterion to know that the sought data record does not reside in the tree is that all the nodes with direct links that were encountered in the return path were already tested. In the latter example only one such node exists (node 114) and therefore if from block 100 data record L is not found the ultimate conclusion is that it does not exist in the tree.

This procedure applies to all modify transactions.

Insofar as insert transaction is concerned, the knowledge that the right transaction is accomplished is done by obtaining calculated node having value that is larger or equal to the current node. Thus, if the search path for inserting a data record leads to node 68 (in FIG. 3A) in direction '1', then if the calculated node between the inserted data record and any one of the data records that can be accessed from node 68 has a value greater or equal to node 68 (value 9) then the current is the node to which the data record being associated. Obviously, for the search transaction the latter procedure determines that the record does not exist in the tree and therefore this serves as termination criterion for deciding whether or not is a sought data item resides in a tree.

The latter example referred to a specific example of horizontal oriented digital tree structure. Those versed in the art will readily appreciate that the latter probabilistic access" characteristics applies mutatis mutamdis to other types of horizontal oriented digital tree structure of the invention.

The probabilistic search characteristics which leads to "errors" stems from the fact that not necessarily all the nodes of the original vertical oriented digital tree structure appear also in all search paths of the horizontal oriented tree structure. Thus, in FIG. 5E, the node 111 (value '0') does not appear in the search path stating from node 114 in block 112 to block 110.

Figures 6, 7:
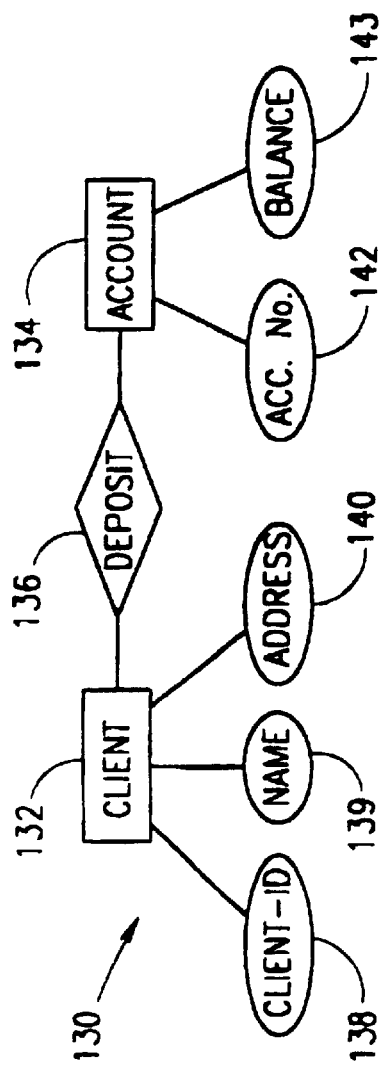
FIG. 6 shows a sample database structure represented as an Entity Relationship Diagram (ERD), and serving for illustrative purposes.
FIG. 7 shows the database of FIG. 6, represented as tables in accordance with the relational data model, with each table holding few data occurrences.

Turning now to another aspect of the invention, there is shown in FIGS. 6 and 7 a sample database structure represented as Entity Relationship Diagram (ERD), and serving for illustrative purposes. Thus, the ERD 130 of FIG. 6 consists of the entities "CLIENT" 132 and "ACCOUNT" 134 as well as an "n to m" "DEPOSIT" 136 relationship, indicating that a given client may deposit to more than one account and, by the same token, a given account may be deposited by more than one client.

As shown, the entity "CLIENT" has the following attributes (fields): "Client_Id" 138 being a key attribute that uniquely identifies each client, "Name" 139 standing for the client's name and "Address" 140 standing for the client's address. The entity "ACCOUNT" has the following attributes (fields): "Acc_No" 142 being a key attribute that uniquely identifies each account, and "Balance" 143 holding the balance of the account. The relationship "DEPOSIT" consists of "CLIENT" and "ACCOUNT" entities, a date and a sum of the deposit, such that each field or fields can participate in the key of the deposit entity. Turning now to FIG. 7, there is shown a database of FIG. 6, represented as three tables 150, 151 and 152 corresponding to the Relational data model 132, 134 and 136, respectively, with each table holding a few data occurrences (data records) for illustrative purposes. It should be noted that the length of the key field ("Client_ID") of the "CLIENT" table is 5 digits, whereas the length of the key field ("Acc_ID") of the "ACCOUNT" table is 6 digits. The client table holds 5 data occurrences 155–159, the account table holds 2 data occurrences 165, 166 and the deposit table holds 3 data occurrences 170–172.

Figure 8:
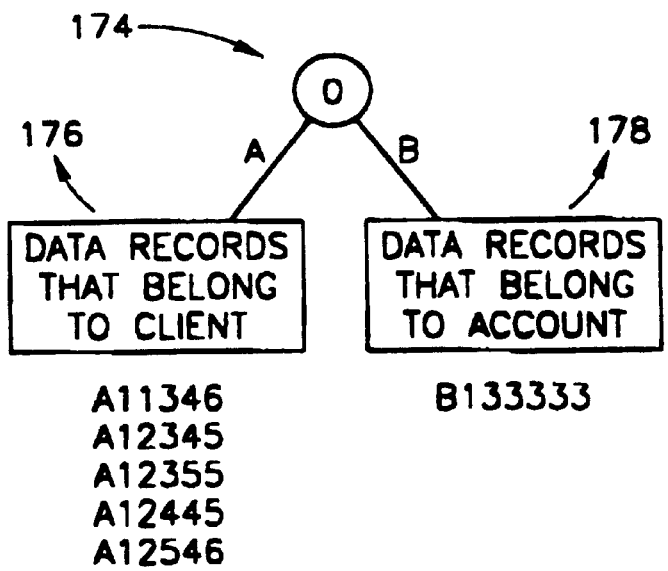
FIG. 8 shows a schematic illustration of a digital tree structure incorporating data dictionary according to one embodiment of the invention.

According to an aspect of the invention a digital tree structure (e.g. binary tree) incorporates also a data dictionary, which according to one aspect provides information as a function of at least the data record type (and as will be shown below, in reference to FIG. 14, additional information such as level of records may also be provided). Thus, all data records that belong to a given data type reside in a well defined "cluster" or sub tree within the tree. The resulting partitioning is illustrated schematically as digital tree 170 shown in FIG. 8. Thus, the symbols 'A' and 'B' at node 0 of the search key represent the respective direction of advancing in order to access the A type (CLIENT) or B type (ACCOUNT) data records. Node 174 inherently divides the data records into two distinct clusters, respectively, such that all data records belong to the CLIENT entity reside in cluster 176 of the tree and all data records that belong to "ACCOUNT" reside in cluster 178 of the tree. Whilst the latter example emphasized the fact that a single digital tree structure of the invention may be associated with data records of different types, this does not prohibit to exploit the specified digital tree structure such that all data records in the tree are of the same type.

Thus, whilst according to hitherto known solutions, data of different types are typically held in different files (and associated with different trees), according to a database management system utilizing a digital tree structure of the invention, different data types may be associated with the same tree. Utilizing only one file is, typically (but not necessarily), advantageous over utilizing a plurality of files since it obviates the need to access and operate on related records through different trees and thereby improves the overall database response time. It also simplifies the memory management requirements, e.g. it enables the use of all the available memory for caching a single tree.

It should be noted that the search keys of data records that belong to different types (and reside in the same tree) do not necessarily have the same length. Thus, in the example of FIG. 8 all records that belong to the "CLIENT" entity have 5 digits, whereas the record 141 that belong to the "ACCOUNT" entity has 6 digit. This characteristic facilitates the application of digital tree structure incorporating data dictionary of the invention in real-life scenarios, where, for example, when dealing with a specific record, the key position, the key size as well as other characteristics are known, since they are defined as such for the specific record type.

In a similar manner, data records that belong to the relationship "DEPOSIT" may be also incorporated in the same tree, e.g. data record 170 from the "DEPOSIT" table of FIG. 7. The pertinent search key consists of the cancatenation of the search keys of "CLIENT" and "ACCOUNT" and "DATE", i.e. "11346133333010198" (being indicative of the fact that "CLIENT" 11346 had made a deposit to an account no. 133333 on a specific date—Jan. 1, 1998). In order to distinguish data records that belong to "DEPOSIT" from those that belong to "ACCOUNT" and "CLIENT", the above tagging technique may be utilized, i.e. all data records that belong to the "DEPOSIT" table are prefixed with the symbol 'C' (as opposed to 'A' and 'B' used for "CLIENT" and "ACCOUNT", respectively). Accordingly, the specified search key is "C11346133333". As is well known to those versed in the art, for the purpose of realizing efficient data manipulation it may be required, in certain scenarios, to view the specified record not as "a client depositing to accounts" but rather as "an account deposited by clients". To this end the search-key of data records belonging to "DEPOSIT" may also be viewed as a concatenation of "ACCOUNT" and "CLIENT" and a "DATE" (e.g. the search key of the same data record 170 is also "13333311346010198"). In order to distinguish this record from its counterpart in the relationship "DEPOSIT" it is prefixed with the symbol 'D', i.e. "D133333113246010198".

Whilst the latter example illustrated one manner of realizing data type (i.e. pre-pending as prefix (character, or any number of bits) to the search key portion), those versed in the art will readily appreciate that this is only one out of many possible variants. In fact, the proposed data dictionary type feature may be realized in any known manner provided that the record type distinguishes between different data records and forms part of the search scheme (e.g. part of the key). The latter statement applies, regardless of whether the data record type: (i) forms part of the data record (or key portion), (ii) being stores elsewhere (e.g. in a different data structure, or (iii) it may be defined elsewhere, or even defined otherwise. An example of the latter is a digital tree structure that is associated with data records all of the same type (e.g. A). Obviously, by this example, it is not required to associated the type of the data record to the instances of the data records or the nodes that constitute the digital tree structure. In this last example the record type might be a property of all records in a specific file and not maintained physically.

The description below concerns another aspect of the data dictionary that is incorporated in the digital tree structure of the invention and which concern relations and associations of different data record. As before, any physical realization is by way of non limiting example only.

Thus, storing both C11346133333010198 and D13333311346010198 in a tree is, obviously, undesired since they represent the same data occurrence (data record 170 of FIG. 7). The data dictionary prescribes that, due to the association feature, they should be modified simultaneously.

Figure 9:
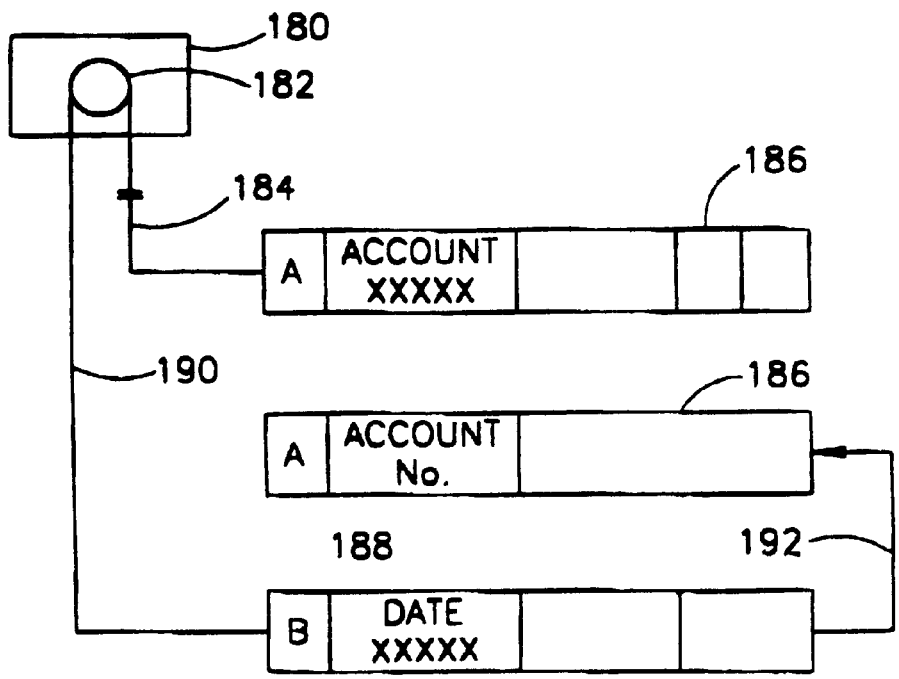
FIG. 9 shows a schematic illustration of a digital tree structure incorporating data dictionary according to another embodiment of the invention.

One possible, yet not exclusive approach to cope with this limitation is shown in the specific example of tree depicted in FIG. 9. Consider, for example, a tree 180 having a leaf node 182 pointing, by means of far link 184, to data record 186 having a search key 'Axxxx' (from the "Account" table) which is composed of a concatenation of the letter 'A' and the contents of the field "Account No.".

Suppose that for every account number, deposits are maintained as a function of the date of deposit. The deposit information in every day is organized in a separate data record (188) having a search key that is composed of the concatenation of the letter 'B' and the contents of the field "date" ("ddmmyy") relating to a specific account having a key composed of the letter A and the specific account number. As shown in FIG. 9, according to an alternative approach data record 188 is linked by means of a far link 190 and data record 186 is accessible by means of pointer 192. Put differently, the leaf node 182 is linked to link list which consists of records 188 and 186. It is important to note that data record 188, albeit having a search key "Byyyy" is connected to a node that forms part of a search path that is defined by the search key of data record 186, i.e. 'Axxxx' and data record 188 'Bxxxxddmmyy'. It should be noted that record 188 is meaningful only in conjunction with record 186 (in a sense it is subordinated thereto). More specifically the field "date" in record 188 is meaningless per se, however it gains meaning when viewed as the "date" of the deposit to account having "account number" as defined in record 186. Accordingly one could possible refer to record 188 as having a search key composed of the concatenation of the search keys of records 186 and 188, i.e. "Axxx-Byyyy". Data record 186, whilst not directly linked to node 182, is associated thereto. In another embodiment a link between a node of the tree will lead to record A (186) and another link that may originate from a different node would lead to record (B). If more B records are inserted for a specific A record, more nodes and links are created in the tree thereby enabling to access the new data records.

Figure 10:
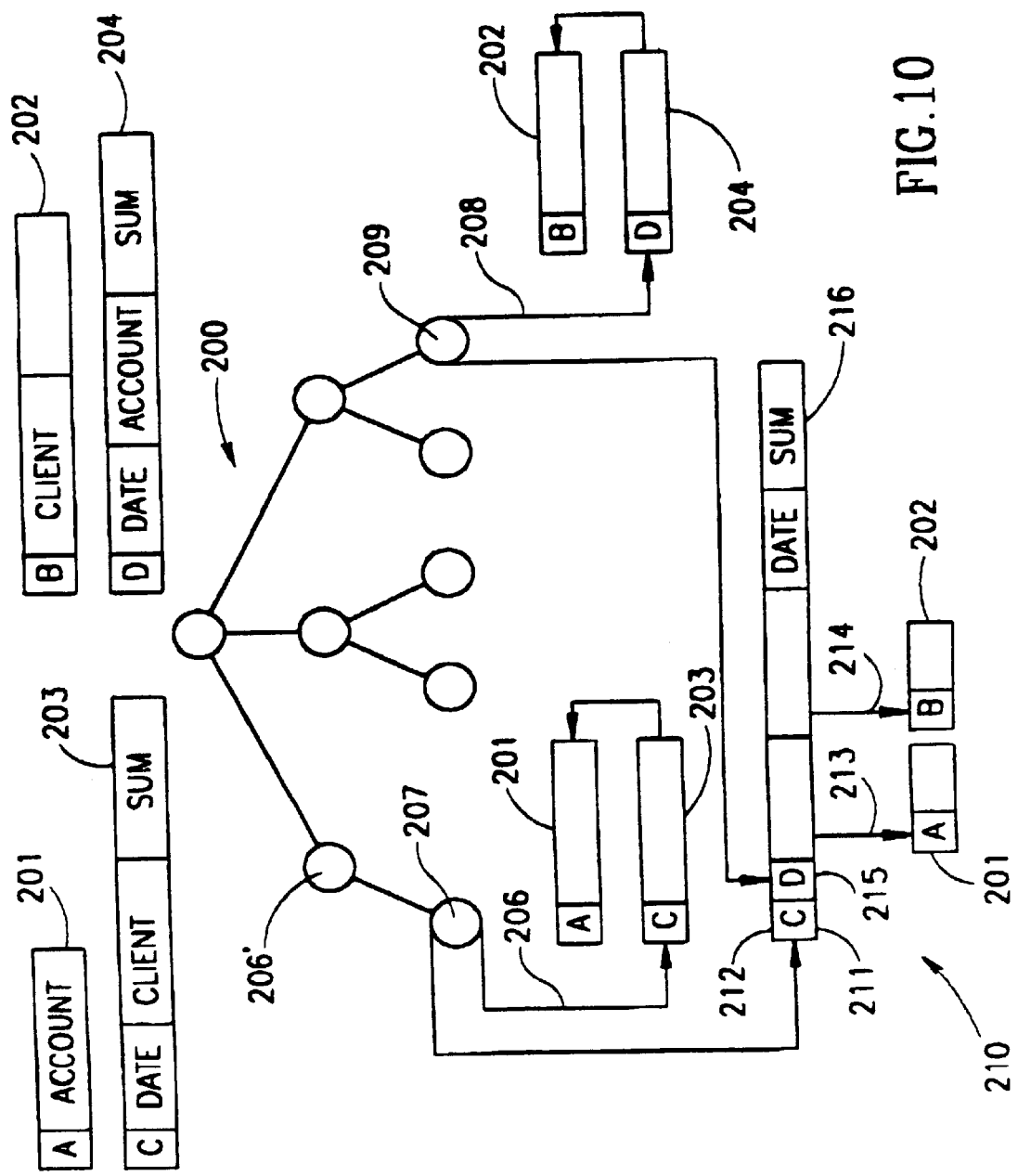
FIG. 10 shows a schematic illustration of a digital tree structure incorporating data dictionary according to yet another embodiment of the invention.

Turning now to FIG. 10, there is shown a schematic illustration of a digital tree structure, according to one embodiment of the invention, utilized for representing the relationship "DEPOSIT", where it needs to approach all the deposits in an account and all the deposits of every client. Reverting to the above example, the specific account data record has a search key 'A133333' (201), the specific Client has a data record 'B11346' (202). The Fact that a given account number ("133333") is associated to a given Client ("11346") in on a specific date is represented as "C01019811346" (203). The latter data record is subordinated to data record 201 and therefore it is identified also by the search key of record 201. Put differently, one can refer to the search key of data record 203 as a concatenation of the search keys of data records 201 and 203, i.e. 'A133333C010109811346'.

By the same toke, data record 204 represents a deposit of a client in an account (data record 202) in a specific date. The search path that leads to data record 204 is identified by concatenation of the search keys of data record 202, i.e. 'B11346' and that of data record 204, i.e. 'D010198133333'.

The resulting tree 200 includes data record 201 and 203 where the latter is linked by means of far link 206 from node 207. As specified before, the search path that leads from node 207 correspond to the search key of data record 203.

The resulting tree 200 further includes data record 202 and 204 where the latter is linked by means of far pointer 208 from node 209. As specified before, the search path that leads from node 209 corresponds to the concatenation of the search keys of data records 202 and 204. As shown in tree 200, the Client and Account data records are duplicated in records 203, 204 (as well as the date and the sum) which is an obvious drawback which results in an undue inflated file.

This drawback may be overcome by representing the DEPOSIT relationship as structure 210. Thus, data records 201 and 203 that are linked from node 207 by means of link 206 and data records 202 and 204, that are linked from node 209 by means of link 208, are represented as a single data structure 210.

As shown, the search path defined by the search keys of records 201 and 203 leads to the first field 212 having a value 'C'. The third field points to the actual data record 201. The second field 215 (having a value 'D') of the same data structure 210 is accessible by search path that is defined by the search key of record 204. The fourth field has a link to the actual data record 202. In this manner the relationship DEPOSIT is represented both as "a client deposited to an account" and as an "account deposited by a client", whilst avoiding duplication of the fields account, client date and sum, i.e. only one instance is used for representing the relationship DEPOSIT. It should be noted that the data elements account and client are accessed by means of link to the original data records (201 and 202) and the rest of the data (date and sum) exists only once within data element 210 hence it has meaning and existence only when such data element exist. Obviously, more fields relating to the deposit operation can be. The invention is by no means bound to a given realization and accordingly the manner of realizing data record 210 as depicted in FIG. 10 is only one out of many possible variants. The number of relations is not limited (i.e. one operation can include the insertion of C within A; D within B; X within Y and so on), and data record 210 will be changed accordingly.

The search path that leads to field 212 ('C') corresponds, of course, to AxxxxCyyyy, whereas the search path that leads to field 215 ('D') corresponds to ByyyyDxxxx. If the sought data record is Axxxx (i.e. the account record 201 per se), then one simply moves in the tree with a search key of 'Axxxx', in the manner specified above, and reaches a given node (e.g. node 206'). From here one could continue to any leaf subordinated thereto (by this particular example there is a sole subordinated leaf node (207)) and therefrom extract record 201 (and 203 if it's subordinated records are also desired) in the manner specified above, or if desired there may be a direct link from node 206' to data record 201. Other implementation are of course feasible, all as required and appropriate.

In a digital tree according to this embodiment, a leaf node is associated with more than one data record (which by this particular embodiment is represented as a sole data structure (210). As shown, the tree 200 includes links to one occurrence (210) representing two different views of the same data records and the relation between them, In this embodiment, one can access by the relevant search scheme and relevant key any or all accounts, any or all deposits of an account, any or all clients and any or all deposits of a client.

The specified description which provides two (and in general case at least two) search paths to one physical occurrence of data records constitutes the association feature of the data dictionary. It should be noted that the association in the manner specified provides an inherent data integrity feature. Consider, for example, insert transaction where deposit of a client (B) to account (A) is inserted. If the specified account does not exist in the alternative search path i.e., Account (A) in the Account client search path A,C, this indicated that the specified account number is incorrect and appropriate error message may be prompted to the user. As before, the dictionary may also represent that operations of modification of C to A and D to B should be performed simultaneously or consecutively whilst composing one transaction that should be either completed or not done at all.

Figure 11:
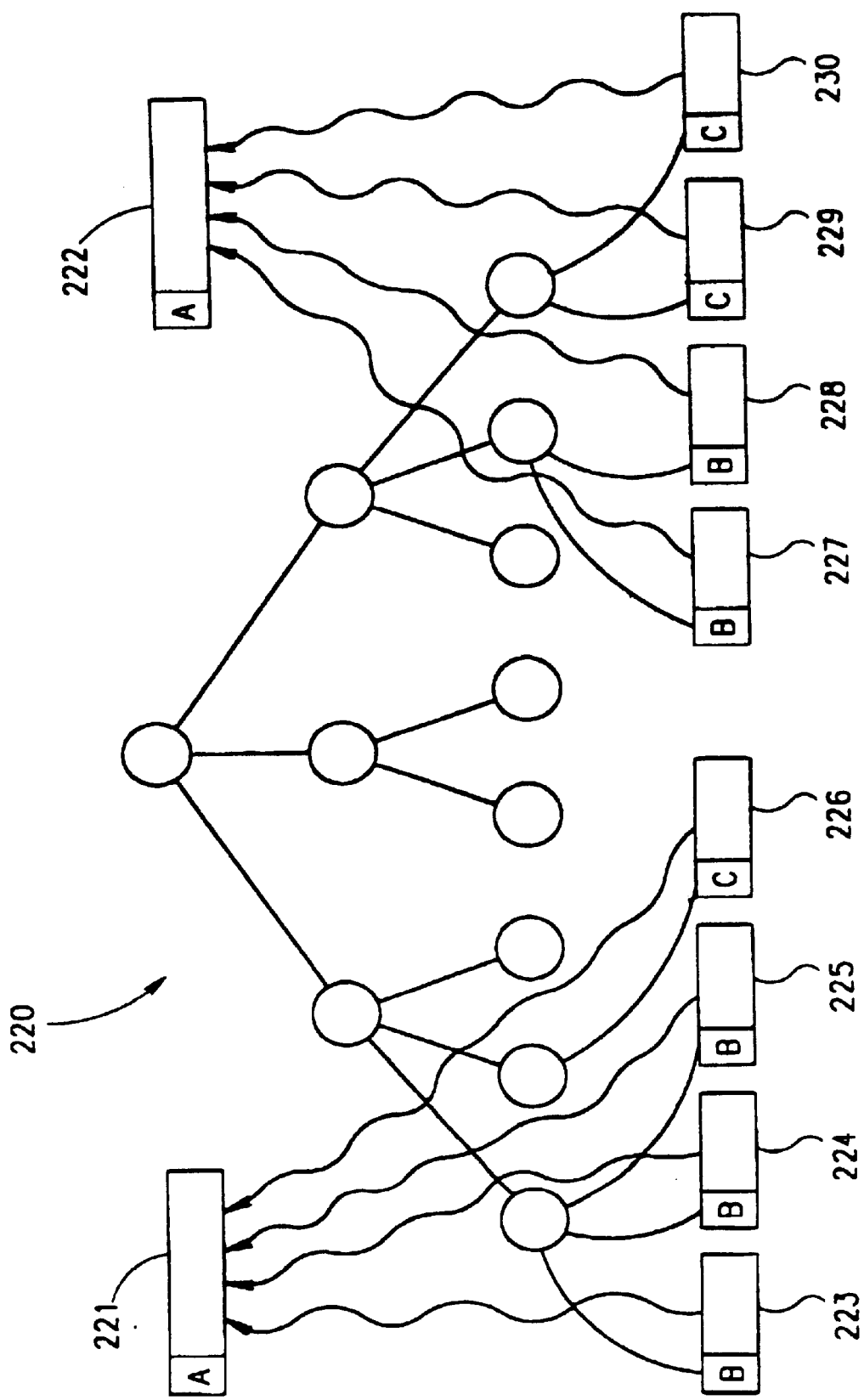
FIG. 11 shows a schematic illustration of a digital tree structure incorporating data dictionary according to still another embodiment of the invention.

Attention is now directed to FIG. 11 showing another aspect of the data dictionary, referred to as ordered structure. As before, the example of FIG. 11 should not be construed as binding.

Thus, tree 220 represents three types of data records designated respectively as A,B,and C—where A may stand for a client, record B stands for an order done by the client and record c stands for a payment of the client. In another embodiment, B and C may be association records described above;. As clearly arises from the tree of the specific embodiment of FIG. 11, there are two occurrences of client records, (221 and 222). For client 221, there are three related orders, (223, 224 and 225), and one payment data record, (226). Client record 222, in its turn, has two orders (227 and 228) and two payment data records (229 and 230). The example of FIG. 11 illustrates the inherent ordered structure that is manifested in a tree of the invention. Thus, the "order" data records B and the payment data records C are subordinated to the specific client data record, thereby reflecting an ordered structure which is similar to a hierarchical data base. In other words, data records 223,224,225 and 226, are all subordinated to a given client data record, 221. In a similar manner, data records 227,228, 229 and 230 are all subordinated to data record 222, reflecting, again, the hierarchical structure. In more digital trees the order between the different records of the same type would be the order resulting from their key, such that the different A records would be ordered among themselves by their keys and the records of a given type subordinated to a given record would again be ordered by their key. This allows accessing groups of records by the order derived from their key.

The same tree may represent at the same time, a known relational structure, where all the client (A) records constitute a client table and all the client data records and their subordinated order records constitute another relational table. In the same manner, all the client records and their subordinated payment records constitute another relational table. By this particular example, the first client table includes data records 221 and 222, the second table (orders) includes data records 221 and its subordinated data records 223,224 and 225, as well as data record 222 and its subordinated B records, data records 227 and 228. The third table (payments) consists of client data record 221 and its subordinated payment data record 226 and client data record 222, and its subordinated payment records, 229 and 230.

A different view of an ordered structure that is manifested in the same tree is a so-called object, in an Object Oriented data model, where given client record and all its subordinated order data records and payment data records, constitute collectively an object. Thus, in this particular example there exists two objects, the first of which consists of a client data record 221 and its subordinated records, 223, 224, 225 and 226, whereas second object consists of client data record 222 and its subordinated data record 227,228,229 and 230.

Accordingly, due to the ordered structure feature of the data dictionary of the invention, it is possible to represent at the same time (depending upon the desired application) a hierarchical data base, and/or a relational data base and/or an object data base, as well as and/or other data models without the necessity to manipulate the data and/or change the trees associated with them. Of course, each of the specified data records can be of more complex structure. e.g. similar to physical data record 211, depicted in FIG. 12. The latter description applies, mutatis mutandis also to complex structures of multidimensional tables or compounds objects—a 3 level structure of records. Thus, for example, records A, K, and O of FIG. 12 can be viewed as a 3 dimensional table (group of O records relating to K record and group of K records relating to every A record) and as an object within an object—records C, F, J, K, L are elements of an A object whereas K is an object that includes O and P records.

FIG. 12 also illustrating another feature of the data dictionary of the invention, i.e. data relationship feature. Thus, data record A (standing for book data record) has C,F,J,K and L data records subordinated thereto. The realization of this hierarchy was exemplified above. According to the present data dictionary feature, a 1:1 and 1:n relations may be easily realized. Consider, for example, that a book may have many categories (L), i.e. 1:n, however, it has only one abstract (K), i.e. 1:1.

According to the proposed feature 1;n data relationship is constituted by the keys of both records in the higher and lower levels (including the record types), whereas 1:1 relationship is constituted by defining the key up to and including the record type of the higher level In this example, there are only two levels and accordingly for the 1: n relation the keys (and of course types) of both book and category are exploited, whereas for the 1:1 relation just the key of the book and the type of abstract are used. Thus, in the digital tree, in order to insert a given category to a book having an ISBN key, the key is defined as: A (type), the key fields in A, L (type), the key fields in L. Conversely, in order to insert an abstract of a book, the key of an the abstract would include A(type), the key fields in A,and B type only.

Whilst data dictionary defines in a comprehensive manner the relation between data records and field in the manner specified, this of course does not pose any constraints on the actual data that is accessed according to user needs. Thus, by way of non-limiting example, if data dictionary defines a data record of type B (having n fields) that is subordinated to a data record in type A(having m fields), the user, upon specific inquiry, can retrieve (e.g. only 2 fields from type A data records) and two fields of type B data record.

The 1:1 and 1:n feature provides yet another data integrity mechanism. Thus, consider for example a transaction which inserts an abstract to a book having a given ISBN key. If the search accesses a book (ISBN) which is already associated with an abstract (i.e. the key already exists in the tree that is used to construct the insert path already exists), then this signifies that the current "insert abstract" transaction is incorrect and appropriate error message should be prompted.

Those versed in the art will appreciate that alphabetic and roman characters designating claim steps are made for convenience of explanation only and should by no means construes as imposing order of steps, or how many times each step is executed vis-a-vis other steps of the method.

The present invention has been described with a certain degree of particularity, but those versed in the art will appreciate that various modifications and alterations may be implemented without departing from the scope and spirit of the following claims:

What is claimed is:

1. A method for obtaining a balanced digital tree structure; the digital tree structure including a first vertical oriented digital tree structure, partitioned into blocks, that is susceptible to unbalanced structure of blocks due to modify transactions; the first digital tree including blocks, each accommodating a plurality of nodes and links forming at least a sparse trie over the keys of the data records that can be accessed from said block; the method including the step of:

(i) constructing i (i>=1) vertical oriented digital tree structure levels which, along with said first digital tree structure, constitute i+1 vertical oriented digital tree structure levels; said at least a sparse trie digital tree constituting the lower vertical oriented tree; the i trees are arranged such that from blocks of the $j^{th}$ tree from among said i trees, it is possible to access horizontally all the blocks of the $(j+1)^{th}$, lower level, digital tree structure, according to a common key value of the accessed block, whereby an essentially balanced horizontal oriented digital tree structure is obtained.

2. The method of claim 1, wherein the nodes within each block of said first digital tree form at least a Patricia trie over the keys of the data records accessible from each of the blocks.

3. The method of claim 1, wherein said first digital tree structure is an interim level vertical oriented tree structure and wherein the nodes of each block of the digital tree structure form at least a sparse trie over the common key values of the blocks of the lower level that are accessible from each said block.

4. The method of claim 1, for maintaining on the fly, a balanced structure of blocks, wherein said step (i) is executed when at least a block of said first digital tree structure of a last layer is being split.

5. The method of claim 1, for obtaining, ex post facto, a balanced structure.

6. A method of claim 1, wherein at least j vertical oriented trees from among said i vertical oriented trees constitute a portion of a horizontal oriented digital tree structure of Btree type.

7. A memory containing a digital tree structure that was generated by the method of claim 1.

8. A method for obtaining a digital tree structure; the tree including blocks each accommodating at least a sparse trie over common keys of the blocks accessible from said block or, in the case of leaf blocks, over the keys of data records accessible from said block; the method comprising executing the following steps as many times as required:

(i) replacing a block, constituting a replaced block, with at least two split blocks; each said split block includes at least a sub-trie of the at least sparse trie of the replaced block:

(ii) if such replaced block have a parent block; updating the at least sparse trie of the parent block such that it is possible to access each of the split blocks by the common key value of each such split block;

(iii) if such replaced block does not have a parent block; creating such parent block; creating at least a sparse trie in the parent block such that it is possible to access each of the split blocks by the common key value of each such split block.

9. The method of claim 8, for obtaining, on the fly, an essentially balanced structure of blocks.

10. The method of claim 8, for obtaining, ex post facto, an essentially balanced structure of blocks.

11. The method of claim 8, wherein the obtained digital tree structure maintains probabilistic search characteristics.

12. A memory containing a digital tree structure that was generated by the method of claim 8.

13. A method for obtaining a balanced digital tree structure; the tree including blocks each accommodating a plurality of nodes and links originated from said nodes; leaf nodes from among said nodes are associated with data records; the method comprising executing the following steps as many times as required:

(I) replacing a block, constituting a replaced block, with at least two split blocks, constituted by a splitting block and at least one split block, such that few from among the nodes of said split block are accommodated within said splitting block and the remaining nodes from among the nodes of said split block are accommodated within the at least one split block; said few nodes including a splitting node associated with at least one split link and the remaining nodes including at least one split node associated with said at least one split link;

(II) in the case that said splitting block is not a child block,
      (f) constituting a father block;
      (g) copying at least the splitting node to the father block, thereby constituting at least one duplicate splitting node;
      (h) linking at least one duplicate splitting node to the splitting block by means of a direct pointer;
      (i) linking, by far link, at least one duplicate splitting node to the at least one split block; the far link(s) having the value of said split link(s);

(III) in the case that said splitting block is a child block of a father block,
      (e) copying at least the splitting node to the father block in the case that it is not accommodated within the father block, the splitting block in the father block constituting a duplicate splitting node(s);
      (f) linking the duplicate splitting node or children node thereof in the father block, to the splitting block by means of a direct link;
      (g) linking, by far link, the duplicate splitting node or children node thereof in the father block to the split block; the far link(s) having the value of said split link(s);
      (h) establishing an intra-block connections between the nodes in the father block in such a way that all the blocks connected with far links from the nodes in the father block can be accessed by their common key applying the search scheme that is relevant in the vertical tree of the father block.

14. A method for obtaining a balanced digital tree structure; the digital tree structure including a first vertical oriented digital tree structure that is susceptible to unbalanced structure of blocks due to modify transactions; the first digital tree including blocks, each accommodating a plurality of nodes and links originating from said nodes; the method including the step of:

(i) constructing an essentially balanced horizontal tree structure having probabilistic search characteristics.

15. A method of claim 14, wherein the structure of the first vertical oriented digital tree structure includes at least a sparse trie over the keys of the data records; said first vertical oriented digital tree structure is partitioned into blocks; each such block includes at least a sub-trie of the at least sparse trie over the keys of such data records; each such data record is accessible by the balanced digital tree structure according to the key of each such said record.

16. A memory containing a digital tree structure that was generated by the method of claim 14.

17. In a digital tree structure having a probabilistic access characteristics, a method for recovering faulty search or modify transaction that is associated with a search path, comprising:

(iii) returning to the search path to a node or block from which another search path can be commenced;

(iv) repeating step (I) until a correct search or modify transaction is accomplished, or a failure criterion is met.

18. A memory containing at least one computer file that includes data representing a digital tree structure, partitioned into blocks, leaf blocks are associated with data records; at least said leaf blocks include at least a sparse trie over keys of the data records accessible from said block; the key of each data record includes a data type.

19. The memory of claim 18, wherein said type is prefixed to said search key or data record.

20. The memory of claim 18, wherein said data dictionary further includes an association feature such that the digital tree structure includes one physical occurrence, such that there are defined at least two search paths that lead to the same physical occurrence.

21. The memory of claim 18, wherein at least one of the data records is a subordinated record.

22. The memory of claim 18, wherein said data type determines properties of the data record by means of a data dictionary that maintains information on the data as a function of the data type.

23. The memory of claim 22, wherein the search keys of data records that belong to different type having different search key size.

24. In a storage medium used by a database file management system executed on a data processing system, a data structure that includes: an index over keys of data records; the key of each such data record includes at least a record type.

25. The storage medium of claim 24, wherein said index includes at least two search paths to the same physical data record.

26. The storage medium of claim 24, wherein said data records include at least one subordinated record.

27. In a storage medium used by a database file management system executed on data processing system, a data structure that includes:

a horizontal oriented digital tree structure arranged in blocks; the horizontal oriented digital tree structure includes a first vertical oriented digital tree structure; wherein the first vertical oriented digital tree structure includes at least a sparse trie over keys of the data records; said first vertical oriented digital tree structure is partitioned into blocks; each such block includes at least a sub-trie of the at least sparse trie over the keys of such data records; the first vertical digital tree structure enables accessing or updating the data records by key or keys, and being susceptible to an unbalanced structure of blocks;

said horizontal oriented digital tree structure enables accessing or updating the data records by key or keys and constitutes a balanced structure of blocks.

28. In a computer system having at least one storage medium:

a digital tree structure over keys of data records; the digital tree is arranged in blocks; leaf blocks are associated with data records; at least each of the leaf blocks includes at least a sparse trie over the keys of said data records; said digital tree structure forms a balanced structure of blocks.

29. The storage medium of claim 28, wherein the key of at least one data record includes a data type.

30. The storage medium of claim 28, wherein at least one of the data records is a subordinated record.

31. The storage medium of claim 28, wherein at least two search paths lead to a same physical occurrence of a data record.

32. The storage medium of claim 28, wherein for one billion data records, the depth of the tree can be 3 regardless of the size of the keys.

33. In a storage medium used by a database file management system executed on data processing system, a data structure that includes:

a horizontal oriented digital tree structure arranged in blocks; the horizontal oriented digital tree structure includes a first vertical oriented digital tree structure; wherein nodes of each block of the first vertical digital tree structure form at least a sparse trie over keys of the data records accessible from said block; the first vertical digital tree structure enables accessing or updating the data records by key or keys, and being susceptible to an unbalanced structure of blocks;

said horizontal oriented digital tree structure enables accessing or updating the data records by key or keys and constitutes a balanced structure of blocks.

34. The memory of claim 18, wherein said digital tree structure constitutes an essentially balanced structure of blocks.

35. In a tree based index over keys of data records; the index is partitioned into blocks; an in-block structure of said index is based on a sparse trie;

a method for searching a sought data record using a search key value and the in-block trie of a series of blocks of said index, comprising:

(i) navigating through a series of one or more blocks of index to an accessed data record using a search scheme; if a key of the accessed data record is different than a key of the sought data record, deciding that the sought data record does not exist or initiating a new search by adding information found in the key of the accessed data record to the search scheme; and (ii) repeating (i) until the key of the accessed data record is identical to the key of the sought data record in which case the sought data record is formed or, otherwise, deciding that the sought data record does not exist.

36. The method of claim 35, wherein said index constitutes an essentially balanced structure of blocks.

37. In a tree based index over keys of data records; the index is partitioned into blocks; an in-block structure of said index is based on a sparse trie;

a method for inserting a new data record by searching for a leaf block whose sparse trie is to be updated by a key of the new data record, comprising:

(i) navigating through a series of one or more blocks to an accessed data record using a search scheme; if a key of the accessed data record is different than a key of the new data record, deciding if a correct leaf block was found or a wrong leaf block was found, and in a case of a wrong leaf block, initiating a new search by adding information found in the key of the accessed data record to the search scheme;

(ii) repeating (i) until a correct leaf block is found or the key of the inserted data record is identical to the key of the accessed data record and thus the inserted data record already exists; and (iii) if the correct leaf block is found, updating a trie of said leaf block to include the inserted key.

38. The method of claim 37, wherein said index constitutes an essentially balanced structure of blocks.

39. In a digital trie structure, partitioned into blocks, leaf blocks are associated with data records; at least each of said leaf blocks includes at least a sparse trie over keys of the data records accessible from said block;

a method for searching for a data record by a key of the searched record; said method includes navigating through one or more search paths in the tree, comprising:

(a) in a case that the data record is not found in a search path, returning in the search path to a node or block from which another search path can be commenced; and (b) repeating step (a) until a correct search or modify transaction is accomplished, or a failure criterion is met.

40. The method of claim 39, wherein said digital tree structure constitutes an essentially balanced structure of blocks.

41. In a trie structure over keys of data records; the trie is partitioned into blocks; a method for creating an essentially balanced structure of blocks, comprising:

indexing common key values of said blocks.

42. The method of claim 41, wherein said trie is a sparse trie.

43. In an index over keys of data records; the index arranged in blocks; said index includes leaf blocks and at least one non-leaf block; at least an in-block structure of the leaf blocks is based on a sparse trie; links to data records are available from at least some of the leaf blocks of said index; said index constitutes an essentially balanced structure of blocks;

a method for searching for a data record by the key of the data record comprising retrieving one or more data records or keys from leaf blocks and not from non-leaf blocks.

44. A memory containing at least one computer file that includes data representing an index over keys of data records; said index is partitioned into blocks and includes leaf blocks and at least one non-leaf block; an in-block structure of at least the leaf blocks of said index is based on a sparse trie; links to data records exist in at least some of the leaf blocks of said index; the non-leaf blocks of said index do not contain links to data records; said index constitutes an essentially balanced structure of blocks.

* * * * *